(12) United States Patent
Park et al.

(10) Patent No.: US 12,263,435 B2
(45) Date of Patent: Apr. 1, 2025

(54) AIR CLEANER

(71) Applicant: LG Electronics Inc., Seoul (KR)

(72) Inventors: Joonmin Park, Seoul (KR); Taeman Yang, Seoul (KR); Choonmyun Chung, Seoul (KR)

(73) Assignee: LG Electronics Inc., Seoul (KR)

( * ) Notice: Subject to any disclaimer, the term of this patent is extended or adjusted under 35 U.S.C. 154(b) by 810 days.

(21) Appl. No.: 17/371,699

(22) Filed: Jul. 9, 2021

(65) Prior Publication Data

US 2022/0032222 A1 Feb. 3, 2022

(30) Foreign Application Priority Data

Jul. 10, 2020 (KR) .......................... 10-2020-0085476

(51) Int. Cl.
*B01D 46/42* (2006.01)
*B01D 46/00* (2022.01)
(Continued)

(52) U.S. Cl.
CPC ......... *B01D 46/0047* (2013.01); *B01D 46/42* (2013.01); *F24F 3/16* (2013.01);
(Continued)

(58) Field of Classification Search
CPC ............... B01D 46/0047; B01D 46/42; B01D 2273/30; F24F 3/16; F24F 11/79;
(Continued)

(56) References Cited

U.S. PATENT DOCUMENTS 9,821,259 B2 * 11/2017 Bae .................... B01D 46/0008
11,364,459 B2 * 6/2022 Jung ........................ F24F 13/28
(Continued)

FOREIGN PATENT DOCUMENTS

CN 104456772 12/2017
EP 3425207 1/2019
(Continued)

OTHER PUBLICATIONS

Extended European Search Report in European Appln. No. 21184692.8, dated Dec. 15, 2021, 8 pages.
(Continued)

*Primary Examiner* — Dung H Bui
(74) *Attorney, Agent, or Firm* — Fish & Richardson P.C.

(57) ABSTRACT

A air cleaner includes a blowing device and a circulator movably disposed above the blowing device. The circulator includes a housing extending in a front-rear direction, a first inlet being formed in a rear portion of the housing and a first outlet being formed in a front portion of the housing, a circulation fan disposed in the housing to suction air through the first inlet and then discharge the air through the first outlet to a front of the housing, and a motor rotating the circulation fan. The first inlet is disposed above a second outlet of the blowing device inside an imaginary extension surface vertically extending an edge of the second outlet, and has a diameter smaller than a diameter of the second outlet, thus suctioning air discharged from the second outlet and increasing an intake ratio of clean air that undergoes a cleaning operation of the blowing device.

18 Claims, 17 Drawing Sheets

(51) Int. Cl.
*F24F 3/16* (2021.01)
*F24F 11/79* (2018.01)
*F24F 13/08* (2006.01)
*F24F 13/20* (2006.01)

(52) U.S. Cl.
CPC ............ *F24F 11/79* (2018.01); *F24F 13/082* (2013.01); *B01D 2273/30* (2013.01); *F24F 2013/205* (2013.01)

(58) Field of Classification Search
CPC .... F24F 13/082; F24F 2013/205; F24F 13/06; F24F 13/08; F24F 13/10; F24F 13/20; F24F 2221/12; F24F 8/10; F24F 13/065; F24F 9/00; F24F 13/28; F24F 2009/002; F04D 25/08; F04D 29/263; F04D 29/403
See application file for complete search history.

(56) References Cited

U.S. PATENT DOCUMENTS

| | | | | |
|---|---|---|---|---|
| 2017/0246576 A1* | 8/2017 | Jung | ........................ | B01D 46/24 |
| 2017/0246578 A1* | 8/2017 | Jung | ........................ | B01D 46/24 |
| 2017/0246579 A1* | 8/2017 | Mun | .................. | B01D 46/0008 |
| 2017/0248153 A1* | 8/2017 | Park | ........................ | F04D 29/703 |
| 2017/0248339 A1* | 8/2017 | Mun | .................. | B01D 46/0047 |
| 2019/0264948 A1* | 8/2019 | Jung | ......................... | A61L 2/22 |
| 2020/0016524 A1* | 1/2020 | Kim | .................. | B01D 46/0052 |
| 2020/0158357 A1* | 5/2020 | Son | ........................ | F04D 25/166 |
| 2021/0331112 A1* | 10/2021 | Kim | .................. | B01D 46/4227 |
| 2021/0404678 A1* | 12/2021 | Tanaka | ...................... | F24F 7/06 |
| 2023/0158435 A1* | 5/2023 | Ha | ........................ | F24F 8/108 55/411 |
| 2023/0194120 A1* | 6/2023 | Ha | ........................ | F24F 13/10 454/228 |

FOREIGN PATENT DOCUMENTS

| | | |
|---|---|---|
| KR | 10-2018-0010055 A | 1/2018 |
| KR | 20190081608 | 7/2019 |
| KR | 10-2020-0058826 A | 5/2020 |

OTHER PUBLICATIONS

Office Action in Korean Appln. No. 10-2020-0085476, mailed on Jan. 22, 2025, 9 pages.

* cited by examiner

AIR CLEANER

CROSS-REFERENCE TO RELATED APPLICATION

This application claims priority to and the benefit of Korean Patent Application No. 10-2020-0085476, filed on Jul. 10, 2020, the disclosure of which is incorporated herein by reference in its entirety.

BACKGROUND OF THE DISCLOSURE

Field of the Disclosure

The present disclosure relates to an air cleaner and, more particularly, to an air cleaner including a circulator that guides clean air discharged from a blowing device in a predetermined direction.

Related Art

An air cleaner is a device that suctions contaminated air in a room (hereinafter referred to as "outside air"), performs a series of cleaning operations, and then supplies clean air to the room.

The air discharged from the air cleaner provides comfort to a user. Thus, a demand for an air cleaner that can freely control the direction of the air discharged from the air cleaner is increasing.

In order to satisfy this demand, Korean Patent No. 10-2026194 discloses an air cleaner including a circulator that suctions clean air discharged from a blowing device and then changes the direction of the clean air to a predetermined direction to discharge the clean air. Here, a rotary guide device may be coupled to the circulator, and may control the motion of the circulator to discharge the air in a predetermined direction. However, the related art is problematic in that, when clean air discharged from an outlet of the blowing device passes through the circulator installed obliquely and is discharged in a predetermined direction, outside air that does not undergo the cleaning operation of the air cleaner may be suctioned into an inlet of the circulator and be discharged together in a predetermined direction.

Moreover, the related art is problematic in that, if the circulator suctions air through the inlet, some air may not pass through the inlet due to an increase in pressure of the air in an intake path, and this air may leak to the outside of the circulator, thus causing a loss of flow energy.

In this case, if a suction ratio of the outside air, which does not undergo the cleaning operation of the blowing device, into the circulator increases, a ratio of the clean air that passes through the inlet and is discharged in a predetermined airflow direction is significantly reduced.

DOCUMENTS OF RELATED ART (Patent Document 1) KR 10-2026194 (Nov. 4, 2019)

SUMMARY

The present disclosure is to solve the above-described problems.

When a circulator is driven, outside air that does not undergo a cleaning operation of a blowing device may be suctioned into a circulator to be discharged in a predetermined direction. The present disclosure is also to provide an air cleaner that reduces a ratio at which the circular suctions the outside air that does not undergo the cleaning operation, and increases a ratio at which clean air discharged from the blowing device is suctioned and then is discharged in a predetermined direction.

The present disclosure is to provide an air cleaner that minimizes the loss of an air volume at which a circulator suctions clean air, even if an intake path area of the circulator is reduced.

When a circulator is driven, some clean air has directivity to be suctioned to the circulator, and may leak to the outside without being suctioned into the circulator while the air flowing. The present disclosure is to provide an air cleaner that guides clean air, which is discharged from a blowing device and flows out of the circulator without passing through the circulator, in a predetermined direction.

Technical objects to be achieved by the present disclosure are not limited to the aforementioned technical objects, and other technical objects not described above may be evidently understood by a person having ordinary skill in the art to which the present disclosure pertains from the following description.

In an aspect, an air cleaner may include a blowing device including a second outlet formed in an upper surface thereof in a circumferential direction, and a blowing fan discharging air through the second outlet to an outside, and a circulator movably disposed above the blowing device, and the circulator may include a housing extending in a front-rear direction, a first inlet being formed in a rear portion of the housing and a first outlet being formed in a front portion of the housing, a circulation fan disposed in the housing to suction air through the first inlet and then discharge the air through the first outlet to a front of the housing, and a motor rotating the circulation fan.

The first inlet may be disposed above the second outlet inside an imaginary extension surface vertically extending an edge of the second outlet, and may be formed to have a diameter smaller than a diameter of the second outlet, thus increasing the intake ratio of clean air discharged from the second outlet, and minimizing an amount of outside air introduced into the circulator.

When the circulator is obliquely erected, a region where the first inlet suctions the air discharged from the second outlet may be defined as an intake region, a region upwardly extending a longitudinal section of the second outlet positioned in the intake region may be defined as an air curtain region, and an oblique position where the circulator is obliquely erected may include a position where the first inlet is spaced apart from the air curtain region. Therefore, upward airflow formed in the air curtain region may serve as a resistance element for preventing the inflow of the outside air, so it is possible to reduce the ratio of the outside air suctioned by the first inlet and to increase the intake ratio of the clean air.

The circulator may be obliquely erected such that a plane formed by the first inlet and an upper surface of the blowing device form an angle of 60° to 70°. Thus, the first inlet may be spaced apart from the air curtain region and the intake ratio of the clean air may become a maximum.

The air cleaner may further include a gear disposed above the blowing device, and a gear motor rotating the gear, and a rack disposed in a rear portion of the circulator and interlocked with the gear to guide a vertical rotation of the circulator, so that the circulator may be moved vertically in a direction where airflow is directed.

When the circulator is obliquely erected, a region where the first inlet suctions the air discharged from the second outlet may be defined as an intake region, a region upwardly extending a longitudinal section of the second outlet positioned in the intake region may be defined as an air curtain region, and an imaginary circle extending the rack along a curvature of the rack may be spaced apart from the air curtain region. Here, the rack may rotate along the imaginary circle to rotate the circulator vertically. Thus, the circulator may have a motion inside the air curtain region, so that it is possible to reduce the ratio of the outside air suctioned into the circulator, when the circulator is obliquely erected.

A filter member may be disposed in the first inlet, so that clean air discharged after undergoing the cleaning operation in the blowing device may be filtered once again, and outside air which does not undergo the cleaning operation may be filtered.

The housing may include a first outer wall extending in the front-rear direction, the first outlet being formed in a front portion of the first outer wall, and a second outer wall having the first inlet formed in a rear portion thereof, and extending from an edge of the first inlet towards the first outer wall to be gradually enlarged in a radially outward direction, thus guiding air, which is discharged from the second outlet and flows along an outside of the first inlet, so that the air flows to the front of the circulator along an outer surface of the first outer wall.

The outer surface of the first outer wall and an outer surface of the second outer wall may form a continuous surface, so flow resistance to air guided along the outer surface of the second outer wall to the outer surface of the first outer wall may be minimized.

The first outer wall may extend in the shape of a band in a circumferential direction about a central axis to have a cylindrical shape, so it is possible to guide air flowing along the outer surface of the first outer wall in a direction where the circulator is intended to discharge air.

The outer surface of the second outer wall may include a first surface extending towards the first outer wall to be rounded outwards, so air flowing along the outside of the first inlet may flow along the curvature of a curved surface formed by the first surface, and flow resistance may be minimized, thus allowing air to be guided to the first outer wall while smoothly changing flow in a direction where airflow is directed.

The outer surface of the second outer wall may include a second surface that extends from the edge of the first inlet towards the first surface so that a slope of a longitudinal section is constant, thus allowing air to be guided to the first surface while minimizing a change in the flow path of air flowing along the outside of the first inlet. When the circulator is obliquely erected, the first outer wall may be disposed in the direction where airflow is directed, and the second outer wall positioned in the intake region may be disposed towards the first outer wall to be gradually enlarged along a direction where the second outlet discharges air. Therefore, clean air discharged from the second outlet and flowing along the outside of the first inlet may advantageously flow along the outer surface of the second outer wall to be guided to the first outer wall. Further, the flow of clean air flowing along the outer surface of the second outer wall and the formation of the inclined surface of the second outer wall with respect to the inflow direction of the outside air serve as a resistance element to the inflow of the outside air into the first inlet, thus reducing the intake ratio of the outside air.

The circulation fan is formed of an oblique-flow fan that suctions the air through the first inlet and then discharges the air through the first outlet in a forwardly inclined direction of the housing, thus minimizing a reduction in air volume and allowing airflow to be circulated even if an intake path area of the first inlet is reduced.

The oblique-flow fan may include a hub disposed in front of the motor, and connected at a center to an output shaft of the motor, a shroud disposed in back of the hub to be spaced apart therefrom and having an inlet formed in a central portion thereof to suction air, and a plurality of blades disposed between the hub and the shroud.

The hub and the shroud may extend towards the front to be gradually enlarged in the radially outward direction, and face the second outer wall. Therefore, air flowing along the outer surface of the second outer wall may be guided to the outer surface of the first outer wall, and simultaneously an area between the hub and the shroud may be maximized, thus maximizing a flow rate of the air that passes between the hub and the shroud.

Each of the blades may extend from the shroud to the hub to be inclined forwards, so air discharged through the blade may flow in a forwardly inclined direction and an area contacting with the blade may be increased to the maximum.

The circulator may include a guide vane device that is disposed in the housing to guide the air discharged by the oblique-flow fan to the front of the housing, so it is possible to guide the air, discharged in the forwardly inclined direction of the housing by the oblique-flow fan, to the front of the housing.

Other specific details of the present disclosure are included in the detailed description and drawings.

Advantageous Effects

A circulator and an air cleaner including a circulator according to the present disclosure have the following effects.

First, it is advantageous in that the arrangement and width of a first inlet are adjusted, and an air curtain region is secured, so a ratio at which a circulator suctions clean air increases, and a ratio at which the circulator suctions outside air is reduced.

Second, it is advantageous in that the loss of an air volume can be minimized even if an intake path area is narrow by using an oblique-flow fan.

Third, it is advantageous in that air discharged from a blowing device and flowing to an outside of a circulator is guided in a predetermined direction through the shape and arrangement of an outer wall of the circulator.

Effects of the present disclosure are not limited to the aforementioned effects, and other effects not described above may be evidently understood by a person having ordinary skill in the art to which the present disclosure pertains from the claims.

DESCRIPTION OF EXEMPLARY EMBODIMENTS

Figure 1:
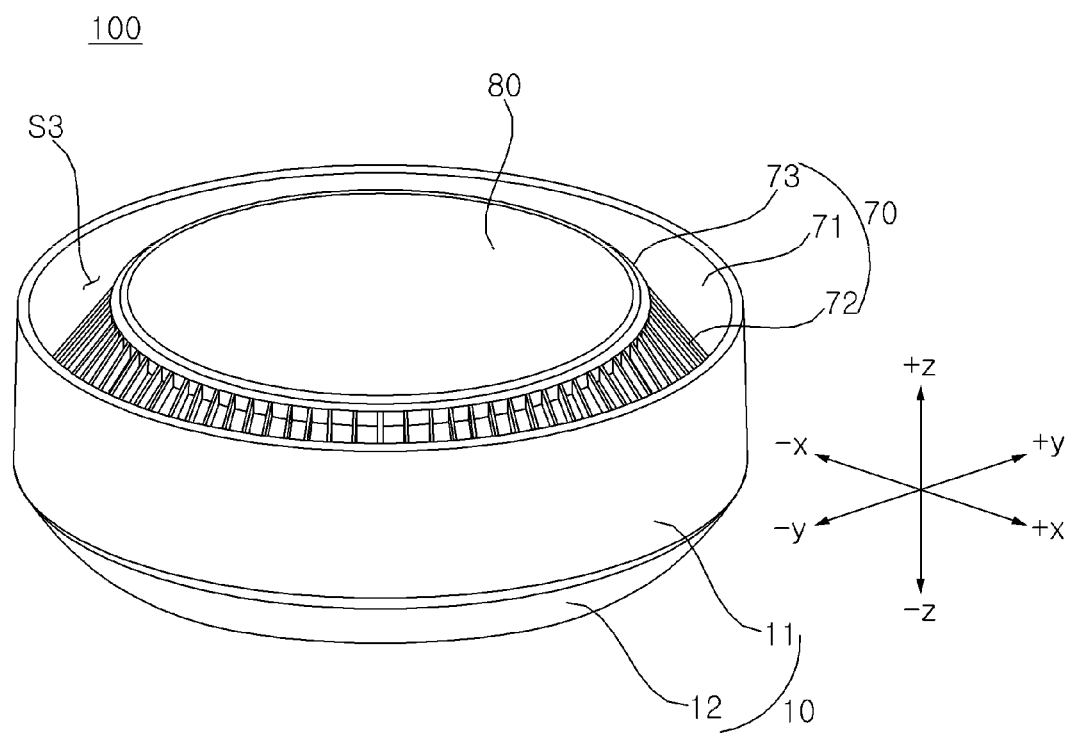
FIG. 1 is a perspective view showing a circulator 100 according to an embodiment of the present disclosure.

The above and other objectives, features, and other advantages of the present disclosure will be more clearly understood from the following detailed description when taken in conjunction with the accompanying drawings. However, the disclosure may be embodied in different forms without being limited to the embodiments set forth herein. Rather, the embodiments disclosed herein are provided to make the disclosure thorough and complete and to sufficiently convey the spirit of the present disclosure to those skilled in the art. The present disclosure is to be defined by the claims. Like reference numerals refer to like parts throughout various figures and embodiments of the present disclosure.

Spatially relative terms, such as "below", "beneath", "lower", "above", or "upper", may be used to easily describe a correlation between one component and another component shown in the drawing. It should be understood that the spatially relative terms cover different directions of components when in use or in operation, in addition to the direction shown in the drawings. For example, when a component shown in the drawing is turned over, a component described as being "below" or "beneath" another component may be placed "above" the latter component. Thus, the exemplary term "below" may include both the terms "below" and "above". The component may also be oriented in a different direction, and thus spatially relative terms may be interpreted according to an orientation.

The terminology used herein is for the purpose of describing particular embodiments only and is not intended to be limiting. In the specification, the singular forms are intended to include the plural forms as well, unless the context clearly indicates otherwise. It will be further understood that the terms "comprise", "include", "have", etc. when used in this specification do not preclude the presence or addition of one or more other features, integers, steps, operations, elements, components, and/or combinations thereof.

Unless otherwise defined, all terms (including technical and scientific terms) used herein may be used as the common meaning understood by those skilled in the art. Further, terms defined in a commonly used dictionary are not to be interpreted in an idealized or overly formal sense unless expressly so defined herein.

The thickness or size of components shown in the drawings may be exaggerated or omitted for the clarity and convenience of description. Further, the size and area of each component do not completely reflect the actual size or area.

Hereinafter, a preferred embodiment of the present disclosure will be described with reference to the accompanying drawings.

Hereinafter, a circulator 100 and an air cleaner 1 including the circulator 100 according to embodiments of the present disclosure will be described with reference to the accompanying drawings.

[Circulator 100]

Hereinafter, the direction of the circulator 100 is defined.

Based on an orthogonal coordinate system shown in FIGS. 1 to 10, a z axis direction may be defined as a front-rear direction of the circulator 100. Here, a direction in which a +z axis is directed may be defined as a front direction, and a direction in which a −z axis is directed may be defined as a rear direction. Since air flows from the −z axis direction through the circulator 100 to the +z axis direction, a side where air is suctioned into the circulator 100 may be referred to as a rear side, and a side where air is discharged from the circulator 100 may be referred to as a front side, based on the z axis.

Further, since the rotating axis of each of a circulation fan 30 and a motor 40 of the circulator 100 is formed parallel to the z axis, a direction in which the z axis is directed may be defined as an axial direction of the circulator 100. Furthermore, a rotating direction about the axial direction may be defined as a circumferential direction. The rotating axis of each of the circulation fan 30 and the motor 40 may be referred to as the central axis of the circulator 100.

Further, a direction in which an xy plane perpendicular to the z axis is formed may be defined as a radial direction of the circulator 100. In other words, it is to be understood that the radial direction is perpendicular to the axial direction. Furthermore, in the radial direction, a direction extending vertically from the center of the z axis towards an outside may be defined as a radially outward direction, and a direction extending vertically from the outside towards the center of the z axis may be defined as a radially inward direction.

Figure 2:
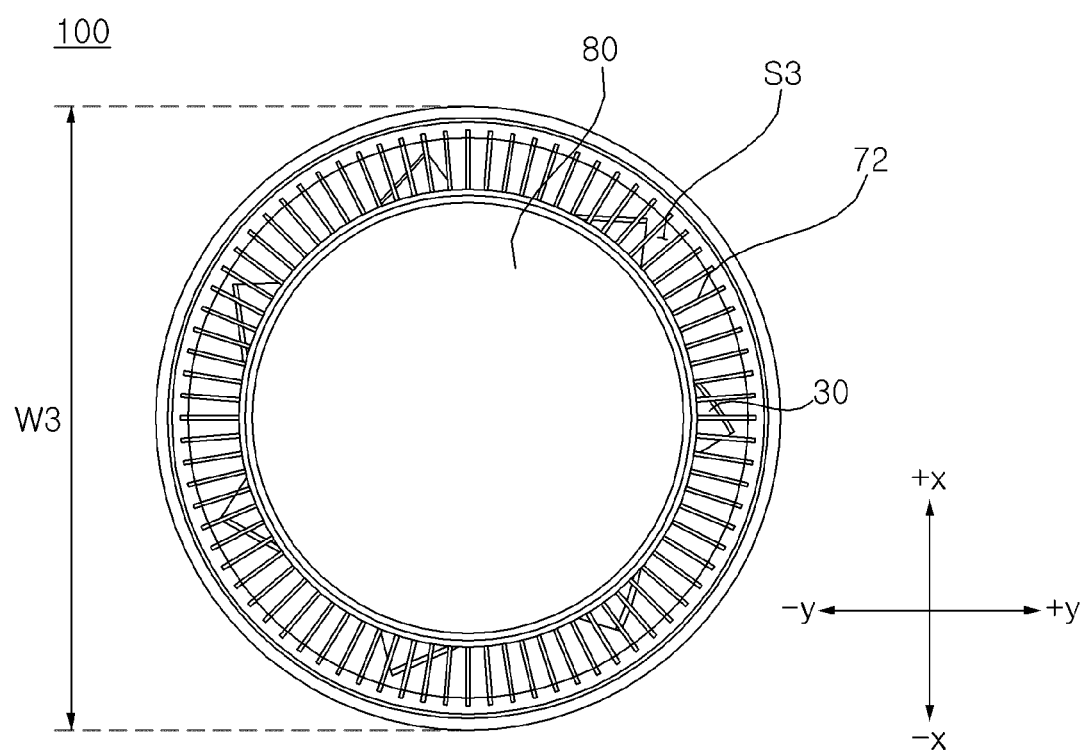
FIG. 2 is a plan view of the circulator 100 of FIG. 1 when seen from a front.
Figure 3:
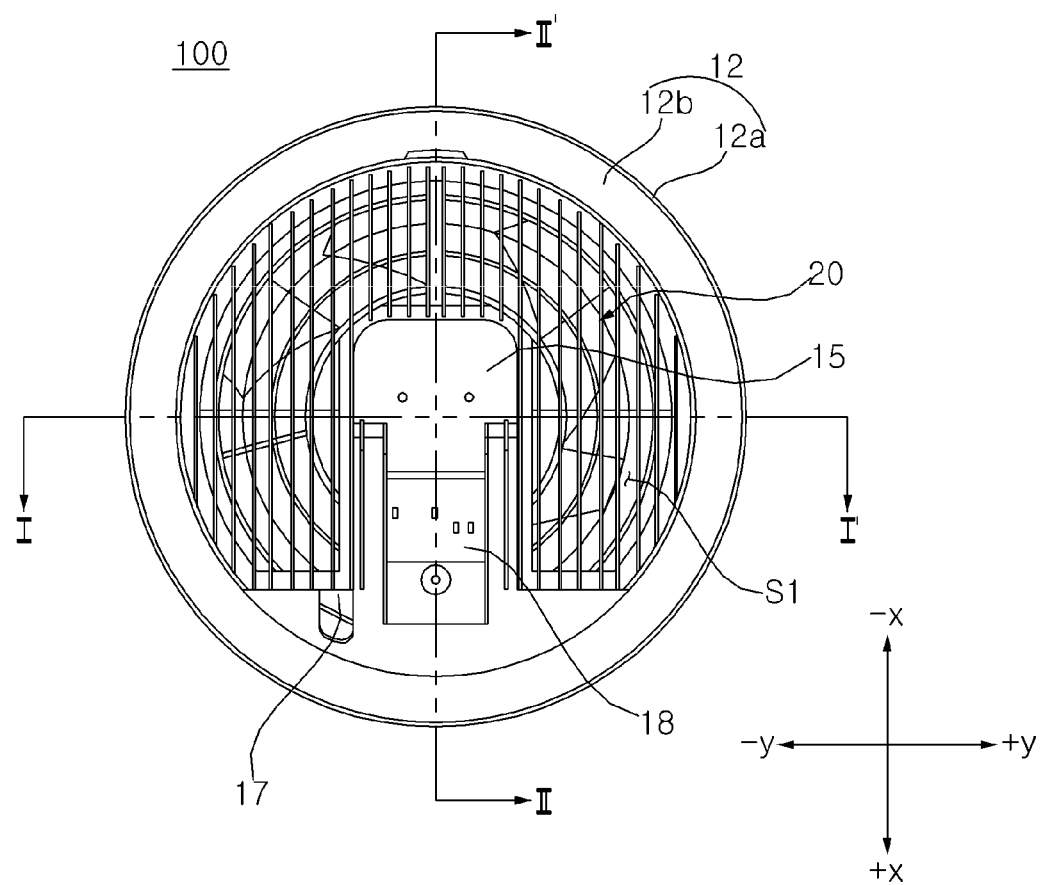
FIG. 3 is a plan view of the circulator 100 of FIG. 1 when seen from a rear.

Referring to FIGS. 1 to 3, a housing 10 may include outer walls 11 and 12 that form an outer circumference in the circumferential direction of the circulator 100. The housing 10 may be opened at a rear thereof to form a first inlet S1, and may be opened at a front thereof to form a first outlet S3. The housing 10 may accommodate internal components of the circulator 100, such as the circulation fan 30 and the motor 40, and may be a basis for distinguishing the inside and outside of the circulator 100 (see FIG. 4).

A front panel 80 may be disposed on the center of the front of the housing 10 to display operation information, and the first outlet S3 may be formed between the housing 10 and the front panel 80. The first outlet S3 may be circumferentially formed between the front panel 80 and the front of the housing 10. Further, a guide vane device 70 may be installed in back of the first outlet S3, and an outer grill 20 may be disposed in the first inlet S1. They will be described below in detail.

Figure 4:
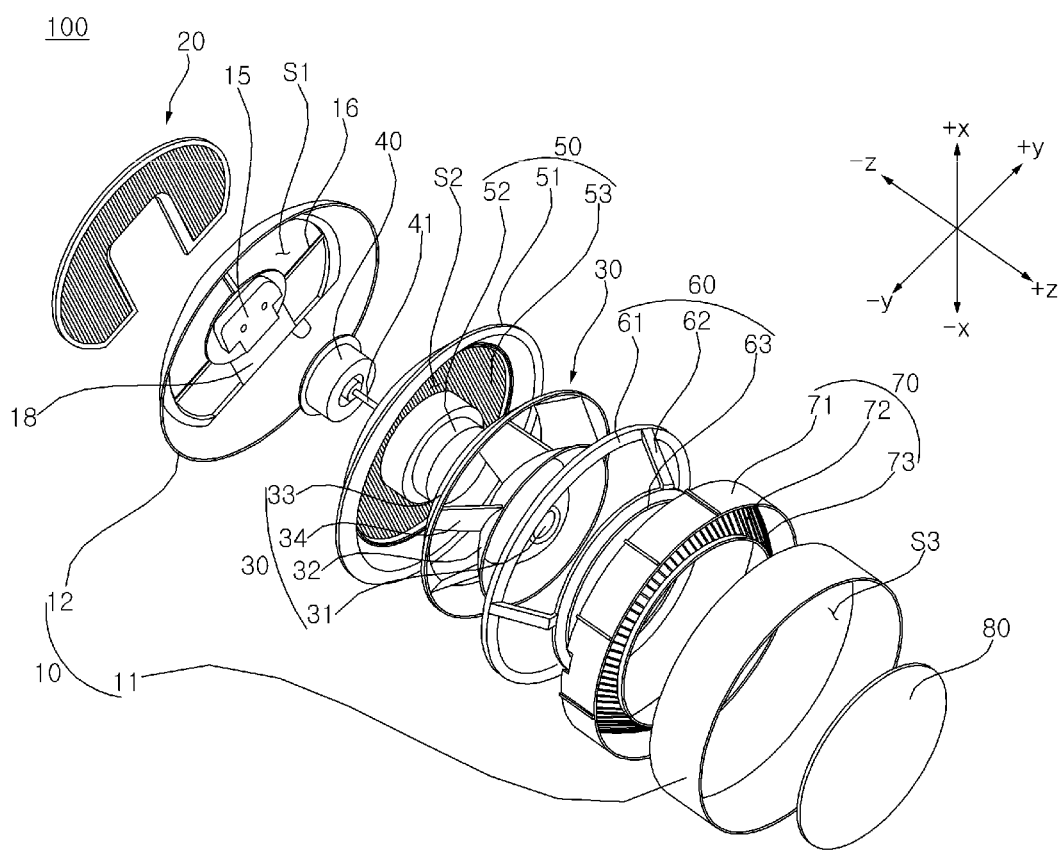
FIGS. 4 and 5 are exploded perspective views of the circulator 100 of FIG. 1.
Figure 5:
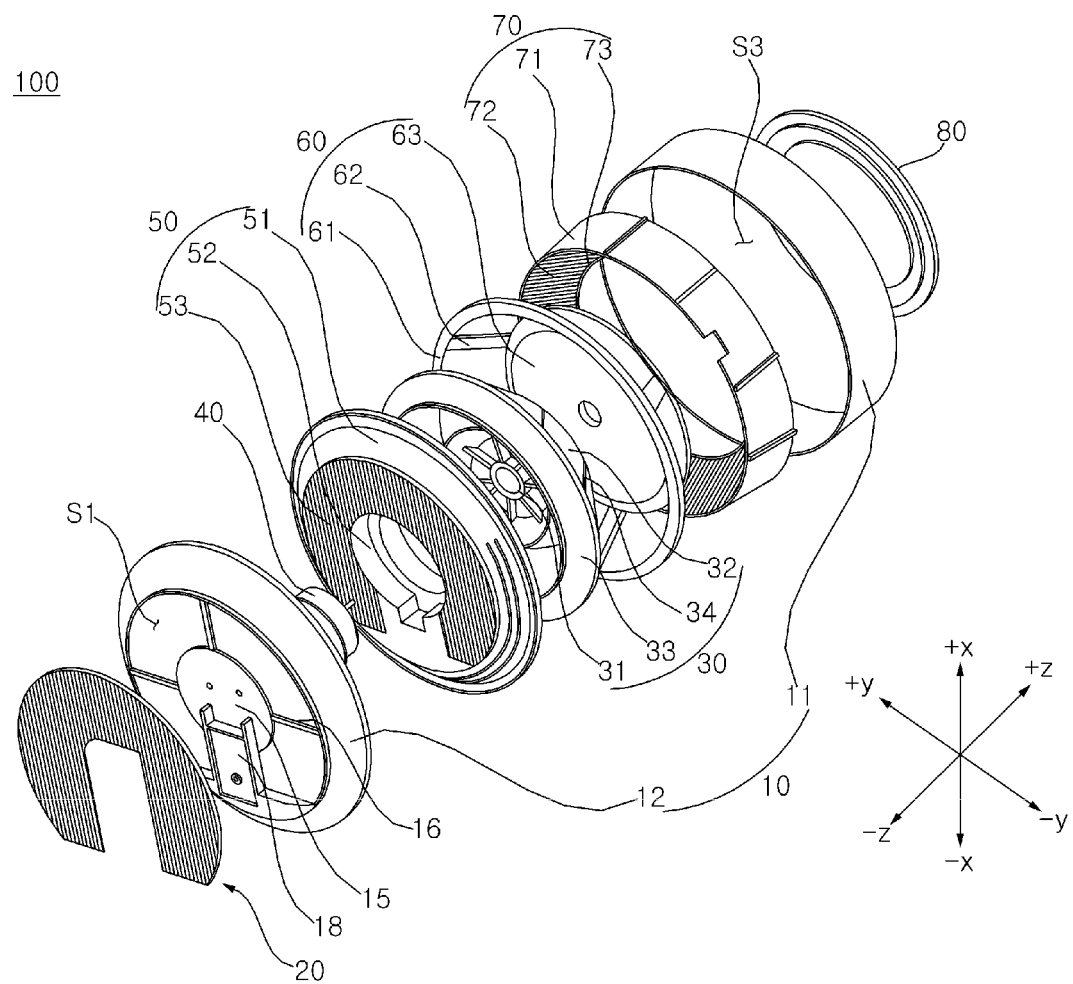
Figure 6:
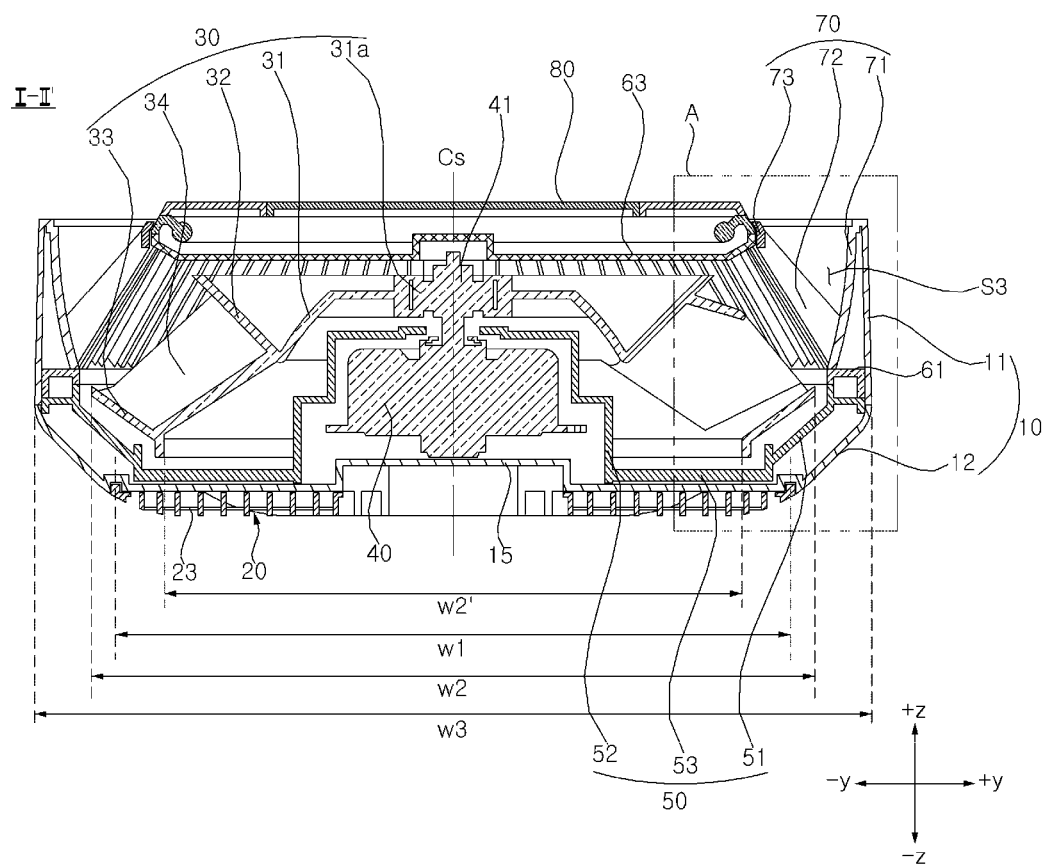
FIG. 6 is a longitudinal sectional view taken along line I-I' of FIG. 3 to show the circulator 100 of FIG. 1.

Referring to FIGS. 4 to 6, the housing 10 may be opened in the front-rear direction to define a path where air flows from the first inlet S1 to the first outlet S3. The outer walls 11 and 12 of the housing 10 may be divided into a first outer wall 11 and a second outer wall 12 disposed in back of the first outer wall 11. The first outer wall 11 and the second outer wall 12 may be integrally formed or be coupled to each other.

The first outer wall 11 may extend in the front-rear direction. The first outer wall 11 may be opened at a front thereof to define the first outlet S3. The first outer wall 11 may circumferentially extend in the shape of a band around the central axis to have the shape of a cylinder. The first outer wall 11 may extend forwards from the second outer wall 12. The first outer wall 11 may be coupled to an outermost circumference of the second outer wall 12.

The second outer wall 12 may be opened at a rear thereof to define the first inlet S1. The second outer wall 12 may extend from an edge of the first inlet S1 towards the first outer wall 11 to be gradually enlarged radially outwards. The second outer wall 12 may extend to be inclined forwards, thus forming a circumference. In other words, the second outer wall 12 may have a shape of a bowl that is reduced in diameter in a direction from the front to the rear, and is opened at a rear thereof.

Figure 7:
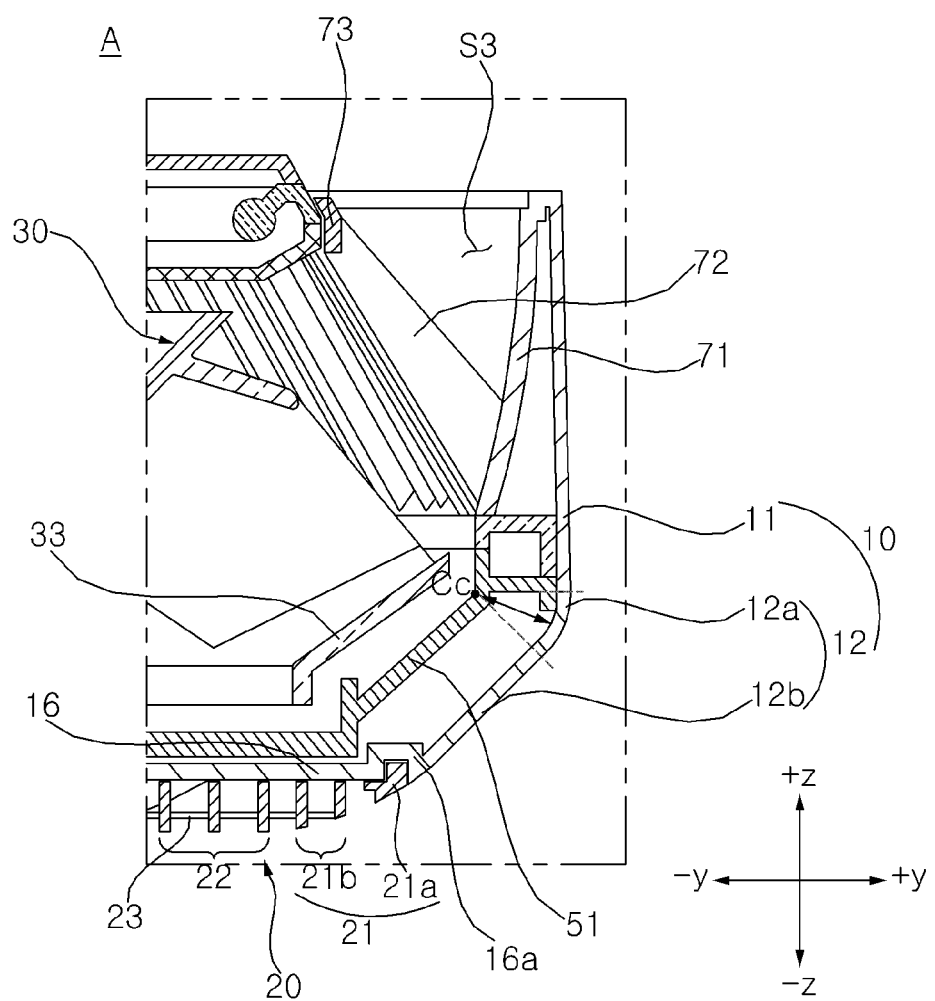
FIG. 7 is an enlarged longitudinal sectional view showing portion A of FIG. 6.
Figure 8:
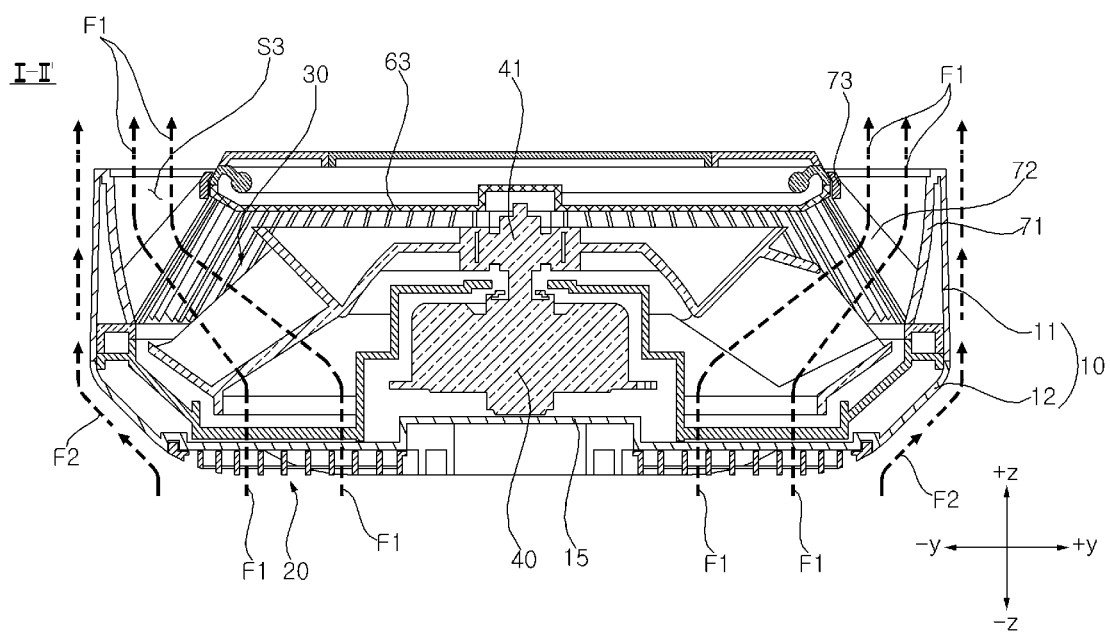
FIG. 8 illustrates the flow of air as a circulation fan 30 rotates in the circulator 100 of FIG. 6.

Here, since the second outer wall 12 extends from the edge of the first inlet S1 towards the first outer wall 11 to be gradually enlarged radially outwards, air flowing along the outside of the first inlet S1 may be guided to flow forwards along the outer surface of the first outer wall 11 through the Coanda effect (see F2 of FIG. 8). This will be described below in detail with reference to FIGS. 6 to 8.

The outer grill 20 through which an air intake passage is formed may be disposed in the first inlet S1 formed in the second outer wall 12. A coupling groove 16a (see FIG. 7) may be formed in back of the second outer wall 12 to guide the placement of the outer grill 20.

The outer grill 20 may include a plurality of partition walls 21 and 22 (see FIG. 7). The outer grill 20 may form a plurality of vent holes between the partition walls 21 and 22. By way of example, the outer grill 20 is configured such that linear vent holes are continuously formed in a circular plate.

Meanwhile, a filter member 23 may be disposed in the first inlet S1 to remove dust from the air that is suctioned through the first inlet S1. In this case, the filter member 23 may be disposed between the plurality of partition walls 21 and 22 or in front of the plurality of partition walls. Here, the plurality of partition walls 21 and 22 of the outer grill 20 may serve as a frame for supporting the filter member 23.

Meanwhile, the circulation fan 30 may be disposed in the housing 10. The circulation fan 30 may be disposed in front of the outer grill 20. The circulation fan 30 may be coupled to the motor 40 that rotates the circulation fan. The circulation fan 30 may rotate to generate air flow. The circulation fan 30 may suction air through the outer grill 20 into the housing 10, and then discharge the air through the first outlet S3 to the front of the housing 10. The circulation fan 30 may use an axial-flow fan or an oblique-flow fan.

The circulation fan 30 may be the oblique-flow fan that discharges air suctioned through the first inlet S1 in a forwardly inclined direction of the housing 10. The oblique-flow fan 30 may include a shaft coupling part 31, a hub 32, a shroud 33, and a blade 34. The oblique-flow fan is advantageous in that it is possible to generate a relatively higher air volume in a limited path area, as compared to the axial-flow fan.

The shaft coupling part 31 may be positioned between a motor cover 52 and a panel base 63, which will be described below. The shaft coupling part 31 is a hollow part that is opened in the front-rear direction, and may be connected to an output shaft 41 of the motor 40 to rotate along with the output shaft.

The hub 32 may be disposed in front of the motor 40, and the shaft coupling part 31 may be formed on the center of the hub to be connected to the output shaft 41 of the motor 40. The hub 32 may be disposed in front of the motor, and may include at least any one of an inner hub 32a having on a center thereof the shaft coupling part 31, and an outer hub 32b extending obliquely from the inner hub 32a radially outwards.

The inner hub 32a may be formed to be convex towards the front, and may have in a rear thereof a space in which the motor 40 and the motor cover 52 are disposed. The inner hub 32a may be formed to surround a portion of the motor 40 and the motor cover 52. The inner hub 32a may have a shape of a bowl that is convex towards the front.

The outer hub 32b may extend to be inclined forwards in the radially outward direction. A front end of the blade 34 may be coupled to a rear surface of the outer hub 32b.

Further, the shroud 33 may be disposed in back of the hub 32 to be spaced apart therefrom, and the circular inlet S2 into which air is suctioned may be formed in the central portion of the shroud 33. The shroud 33 may be formed in a ring shape to surround at least a portion of the motor 40. Here, a diameter w2' of the inlet S2 formed in an inner circumferential end of the shroud 33 may be formed to be equal to or smaller than a diameter w1 of the first inlet S1.

The shroud 33 may be disposed in back of the hub 32 to be radially outwards spaced apart therefrom. Here, the front surface of the shroud 33 may be obliquely formed forwards to face the rear surface of the outer hub 32b. Therefore, the outer hub 32b and the shroud 33 may guide the air suctioned through the inlet S2 to cause the air to flow in a forward inclined direction. The outer hub 32b and the shroud 33 may extend forwards to be gradually enlarged in the radially outward direction, and may face the second outer wall 12. In other words, when the second outer wall 12 is obliquely formed, the outer hub 32b and the shroud 33 may be inclined to face the second outer wall 12. Therefore, air flowing along the outer surface of the second outer wall 12 may be guided to the outer surface of the first outer wall 11, and simultaneously an area between the outer hub 32b and the shroud 33 may be maximized, thus maximizing a flow rate of the air that passes between the outer hub and the shroud.

A plurality of blades 34 may be disposed between the hub 32 and the shroud 33 to connect the hub and the shroud. Each blade 34 may extend from the front surface of the shroud 33 towards the rear surface of the outer hub 32b to be inclined forwards. In other words, the blade 34 may extend to be inclined forwards in the axial direction corresponding to the flow direction of the air. Thus, the air flowing out through the blade 34 may flow in a forwardly inclined direction, and an area coming into contact with the blade 34 may be increased to the maximum.

Meanwhile, as the diameter w1 of the first inlet S1 is decreased, the intake path area may be reduced and the area of the second outer wall 12 may be increased. In the case of the oblique-flow fan 30, the air is suctioned from the first inlet S1 and then is discharged in a forwardly inclined direction. Thus, even if the intake path area is reduced as compared to the axial-flow fan, airflow may be circulated while a reduction in air volume is minimized.

In the case of using the oblique-flow fan 30, even if the diameter w1 of the first inlet S1 is formed to be smaller than the diameter w2 of the oblique-flow fan 30, a loss of air volume that is suctioned through the first inlet S1 into the circulator 100 and then is discharged may be minimized, and simultaneously the area of the second outer wall 12 for inducing the Coanda effect may be secured. Therefore, the diameter w1 formed by the edge of the first inlet S1 may be equal to or larger than the diameter w2' formed by the inner circumferential end of the shroud 33, and may be smaller than the diameter w2 formed by the outer circumferential end of the shroud 33. Meanwhile, the circulator 100 may further include a motor base 15. The motor base 15 may be disposed in front of the outer grill 20. The motor base 15 may be disposed in the center of the rear of the second outer wall 12. The motor base 15 may be disposed to be spaced apart from the innermost circumference of the second outer wall 12.

The first inlet S1 may be formed between the motor base 15 and the second outer wall 12. Further, a support bar 16 may extend long from a side of the second outer wall 12 towards the motor base 15 in the radially inward direction. The motor base 15 may be disposed in back of the motor 40 to support the motor.

A connection plate 18 may extend from a side of the second outer wall 12 in the radially inward direction to be connected to the motor base 15. A second rack 295 of a second rotary guide mechanism may be coupled to the rear of the connection plate 18 to guide a rotation in a second direction (see FIG. 11). A wire hole 17 (see FIG. 3) may be formed in the connection plate 18 to cause an electric wire connected to the motor 340 or a display 390 to pass therethrough.

Meanwhile, the circulator 100 may further include a motor receiving part 50. The motor receiving part 50 may include at least any one of a rear inner wall 51, a motor cover 52, and an inner grill 53.

The rear inner wall 51 may be disposed in front of the outer grill 20. The rear inner wall 51 may be opened at a front and a rear thereof, and may form a portion of an inner circumference of the circulator 100 in a circumferential direction.

The rear inner wall 51 may extend from the rear towards the front to be gradually enlarged in the radially outward direction. The rear inner wall 51 may be obliquely formed to face the shroud 33. In other words, the rear inner wall 51 may have the shape of a bowl that is reduced in diameter in a direction from the front to the rear and is opened at a rear thereof.

Further, the rear inner wall 51 may be disposed in the second outer wall 12. The rear inner wall 51 may be configured such that an outer end of a front thereof formed in the circumferential direction is bent rearwards to be hooked to a groove (unlabelled) formed in an inner circumference of the second outer wall 12.

Further, the motor receiving part 50 may include on a rear portion thereof the inner grill 53 to define a passage through which air is suctioned. The inner grill 53 may be formed in back of the open rear inner wall 51. The motor cover 52 may be disposed on the center inside the rear inner wall 51. The inner grill 53 may be formed between the rear inner wall 51 and the motor cover 52.

The motor cover 52 may have on the front thereof a concave groove corresponding to the shape of the motor 40 to accommodate the motor 40. The motor cover 52 may be formed to surround the motor. The motor 40 may be disposed between the motor base 15 and the motor cover 52, and the motor cover 52 may be disposed between the motor 40 and the circulation fan 30. Further, a space may be defined between the rear inner wall 51 and the motor cover 52 to accommodate a portion of the circulation fan 30.

A hole may be formed in the center of the front of the motor cover 52 to allow the output shaft 41 of the motor 40 to pass therethrough. The output shaft 41 may pass through the hole formed in the front of the motor cover 52 to be coupled to the shaft coupling part 31 formed on the circulation fan 30.

Meanwhile, the circulator 100 may further include a fan cover part 60 that is disposed in front of the circulation fan 30. The fan cover part 60 may include a corner support part 61, a bridge 62, and a panel base 63.

The corner support part 61 may be disposed in front of the rear inner wall 51. The corner support part 61 may have the shape of a ring extending in the circumferential direction. The rear inner wall 51 may have a step or a hook corresponding to the shape of the corner support part 61, so that the corner support part may be seated thereon.

Further, a panel base 63 may be disposed in front of the corner support part 61. The diameter of the panel base 63 may be smaller than that of the corner support part 61. The panel base 63 may be positioned in the center of the first outer wall 11. A front panel 80 may be mounted in front of the panel base 63. The front panel 80 and the panel base 63 may have corresponding disc shapes. A controller (not shown) may be disposed between the panel base 63 and the front panel 80 to display operation information on the front panel 80 and to control the operation of the circulator 100 and the air cleaner 1 that will be described later. A PCB substrate may be used as the controller (not shown).

The bridge 62 may be disposed between the corner support part 61 and the panel base 63 to connect the corner support part and the panel base. The bridge 62 may have the shape of a bar that extends from an inner peripheral surface of the corner support part 61 towards the panel base 63 to be long in the radially inward direction. The bridge 62 may be obliquely formed to face the blade 34 of the circulation fan 30. A plurality of bridges 62 may be arranged in the circumferential direction of the corner support part 61.

The circulation fan 30 may be disposed inside the fan cover part 60. The panel base 63 of the fan cover part 60 may cover the fronts of the hub 32 and the shaft coupling part 31 of the circulation fan 30. A passage may be formed between a plurality of bridges 62 that are disposed between the corner support part 61 and the panel base 63 to allow air to pass therethrough.

Meanwhile, the circulator 100 may further include a guide vane device 70 that is disposed between the first outer wall 11 and the oblique-flow fan 30 and guides air, discharged obliquely from the oblique-flow fan to the front, in the axial direction of the oblique-flow fan to discharge the air to the front of the housing. The guide vane device 70 may include a front inner wall 71, a guide vane 72, and a vane coupler 73.

The front inner wall 71 may be disposed inside the first outer wall 11, and may form a portion of the inner circumference of the circulator 100 in the circumferential direction. The front inner wall 71 may be coupled to the corner support part 61 in front of the corner support part 61.

Further, the front inner wall 71 may extend from the corner support part 61 to the front end of the first outer wall 11 in the front-rear direction. The first outlet S3 may be formed between the front inner wall 71 and the panel base 63. The front inner wall 71 may extend from the corner support part 61 towards the front to be gradually enlarged in the radially outward direction. The front inner wall 71 may be formed to be rounded towards the front, thus minimizing the loss of flow energy and guiding the air to the first outlet S3 that is at the front position.

The vane coupler 73 may be formed in the shape of a ring extending in the circumferential direction. The vane coupler 73 may be disposed at the center on the front side of the front inner wall 71. The vane coupler 73 may be coupled to the outer circumference of the panel base 63. Further, the first outlet S3 may be formed between the vane coupler 73 and the front inner wall 71.

The guide vane 72 may be disposed between the front inner wall 71 and the vane coupler 73. A plurality of guide vanes 72 may be obliquely arranged along the outer circumference of the vane coupler 73. Plates of the guide vanes 72 curved along a curved shape may be radially installed about the vane coupler 73.

One side of the guide vane 72 may be connected to the outer peripheral surface of the vane coupler 73, while the other side of the guide vane may be connected to the inner peripheral surface of the front inner wall 71. The guide vane 72 may be installed towards the front to be inclined in the radially inward direction. The guide vane 72 may be installed to face the blade 54.

Since the guide vane 72 is obliquely installed, an air discharge area may be increased to allow a larger amount of air to be discharged to the front of the guide vane 72. Further, since the cylindrical front inner wall 71 is installed on the outside of the guide vane 72, air discharged from the guide vane 72 may linearly move forwards while coming into contact with the inner peripheral surface of the front inner wall 71. Thus, the linearity of the discharged air may be improved, and the air volume may reach a more distant position.

Referring to FIGS. 6 to 8, as described above, the outer walls 11 and 12 of the housing 10 may include a first outer wall 11 having on a front thereof the first outlet S3 and a second outer wall 12 having on a rear thereof the first inlet S1. Further, the first outer wall 11 may be disposed in front of the second outer wall 12 to extend in the front-rear direction, and the second outer wall 12 may extend from the edge of the first inlet S1 towards the first outer wall 11 to be gradually enlarged in the radially outward direction.

Meanwhile, if the circulation fan 30 is rotated by the motor 40, air (hereinafter referred to as "outside air") present outside the circulator 100 may be suctioned through the outer grill 20 disposed in the first inlet 51. Thereafter, the suctioned air may pass through the interior of the circulator 100 and then may be discharged through the first outlet S3 formed in the front of the first outer wall 11 to the front of the housing 10 (see F1 of FIG. 8). Here, as the circulation fan 30 rotates, some of the outside air flowing towards the outer grill 20 may leak to the outside of the circulator 100 while having directivity without being suctioned through the outer grill 20 into the circulator 100, thus causing a loss of flow energy.

Here, the second outer wall 12 may extend from the edge of the first inlet 51 towards the first outer wall 11 to be gradually enlarged in the radially outward direction, thus guiding air flowing along the outside of the first inlet S1 through the Coanda effect to cause the air to flow forwards along the outer surface of the first outer wall 11 (see F2 of FIG. 8).

The above-described Coanda effect refers to an effect in which, when fluid flowing in one direction comes into contact with solid, the fluid adheres to a surface of the solid instead of flowing linearly, and thus flows along the surface of the solid.

In other words, air leaking to the outside of the first inlet S1 may be guided along the outer surface of the second outer wall 12 to the outer surface of the first outer wall 11. Subsequently, the air may flow along the outer surface of the first outer wall 11 extending in the front-rear direction to a direction where the airflow of the circulator 100 is directed (see F2 of FIG. 8).

The first outer wall 11 and the second outer wall 12 may be integrally coupled to each other, and may form a continuous circumferential surface in the circumferential direction without having an outwardly protruding portion in the coupled portion. The outer surface of the first outer wall 11 and the outer surface of the second outer wall 12 may form a continuous surface, thus minimizing flow resistance to air that is guided along the outer surface of the second outer wall 12 to the outer surface of the first outer wall 11.

Further, the first outer wall 11 may circumferentially extend in the shape of a band around the central axis to have the shape of a cylinder. Therefore, the first outer wall 11 may guide the air flowing along the outer surface of the first outer wall 11 to a predetermined direction in which the circulator 100 discharges the air.

Further, the outer surface of the first outer wall 11 may be formed to be parallel to the rotating axis of the circulation fan 30 in the front-rear direction. Here, the diameter w3 formed by the outer circumferential end of the first outer wall 11 may be equal to the diameter w3 formed by the outer circumferential end of the second outer wall 12. Therefore, it is advantageous in that it is possible to secure a large discharge path area of the circulator 100 and simultaneously to increase linearity where the air flowing along the outer surface of the first outer wall 11 is directed to a predetermined direction.

Here, it is to be understood that the term "parallel" does not mean that two components should strictly form the angle of 180 degrees, and includes that two components are slightly inclined in a radial direction to be almost parallel to each other. In other words, the diameter of the front portion of the first outer wall 11 may be formed to be finely reduced from the rear to the front.

Meanwhile, the second outer wall 12 may be formed to surround at least a portion of the shroud 33 of the circulation fan 30. Further, the first outer wall 11 disposed in front of the second outer wall 12 may be formed to surround at least a portion of the hub 32 of the circulation fan 30. In other words, the circulation fan 30 may be accommodated in the housing 10, and may be disposed between the first outer wall 11 and the second outer wall 12 of the housing 10.

Meanwhile, the outer surface of the second outer wall 12 may include a first surface 12a extending to be rounded in the radially outward direction towards the first outer wall 11 disposed in front of the second outer wall. The first surface 12a may extend from the edge of the first inlet S1 to the first outer wall 11, or may extend from the front of a second surface 12b, which will be described below, to the first outer wall 11.

The first surface 12a may be formed to be convex to the outside of the housing 10, thus forming the center of a curvature radius in an inward direction of the housing 10. The first surface 12a may form the centers of a plurality of curvature radii in the front-rear direction. For example, the curvature radius formed by the curved surface of the first surface 12a may be gradually increased towards the front, so the curvature radius may become a maximum at a connection portion connected to the first outer wall 11.

The first surface 12a may be connected to the rear of the first outer wall 11. The first surface 12a may be formed to be rounded at the connection portion between the outer surface of the first outer wall 11 and the outer surface of the second outer wall 12.

In this case, air flowing along the outside of the first inlet S1 may flow along the curvature of the curved surface formed by the first surface 12a of the second outer wall 12 to minimize flow resistance, thus allowing the air to be guided to the first outer wall 11 while smoothly changing the flow in a direction where airflow is directed.

Meanwhile, the outer surface of the second outer wall 12 may include a second surface 12b that extends from the edge of the first inlet S1 towards the first surface 12a so that the slope of the longitudinal section is constant. Here, the first surface 12a may be disposed between the second surface 12b and the outer surface of the first outer wall 11. The longitudinal section of the second surface 12b may extend almost linearly towards the first surface 12a, so the second surface 12b may minimize a change in flow path and may guide air flowing along the outside of the first inlet S1 to the first surface 12a.

Meanwhile, the outer grill 20 may be disposed in the first inlet S1 that is formed in the rear of the second outer wall 12. The outer grill 20 may include a plurality of partition walls 21 and 22 that are spaced apart from each other to form a plurality of vent holes therebetween. In this case, the second outer wall 12 may extend from the edge of the outer grill 20 towards the first outer wall 11 to be gradually enlarged in the radially outward direction. Therefore, the diameter w3 formed by the outer circumferential end of the second outer wall 12 and/or the diameter w3 formed by the outer circumferential end of the first outer wall 11 may be greater than the diameter w1 formed by the circumference of the outer grill 20.

The plurality of partition walls 21 and 22 may include a plurality of outer partition walls 21 disposed adjacent to the edge of the outer grill 20. The plurality of outer partition walls 21 may be formed such that ends thereof are inclined towards the outer surface of the second outer wall. Therefore, in the air flowing along the outside of the outer grill 20, air that is not suctioned through the outer grill 20 may flow along an end surface of the outer grill 20 to be guided to the second outer wall 12.

Further, the ends of the plurality of outer partition walls 21 may be rounded to form an inclined surface that is continuous with the outer surface of the second outer wall 12. Here, when an imaginary line passing through the outer surface of the second outer wall 12 and the end surface of the outer partition wall 21 extends, the imaginary line may form a continuous gentle curve. Therefore, it is possible to minimize flow resistance when the air flows along the end surface of the outer grill 20 to be guided to the second outer wall 12.

The outer partition wall 21 may include a first outer partition wall 21a forming the edge of the outer grill 20, and a second outer partition wall 21b disposed inside the first outer partition wall 21a. The second outer wall 12 may extend from the first outer partition wall 21a forming the edge of the outer grill 20 towards the first outer wall 11. Further, the outer surface formed by the end of the first outer partition wall 21a may be formed to be rounded, so the outer surface of the first outer partition wall 21a and the outer surface of the second outer wall 12 may form a continuous inclined surface.

Meanwhile, a coupling protrusion (unlabelled) may formed on a front surface of the first outer partition wall 21a to protrude forwards, and the outer wall 12 may be depressed in a rear thereof to have a shape corresponding to that of the coupling protrusion, thus forming a coupling groove 16a. Therefore, the outer grill 20 may insert the coupling protrusion formed on the first outer partition wall 21a into the coupling groove 16a to be coupled to the rear of the second outer wall 12.

Meanwhile, the plurality of partition walls 21 and 22 may include a plurality of inner partition walls 22 that are disposed inside the outer partition wall 21 such that ends thereof are positioned on a flat surface. Here, the inclined surface formed by the respective ends may become gradually gentle from the first outer partition wall 21a to the second outer partition wall 21b, so a surface formed by the ends of the plurality of inner partition walls 22 may be positioned on the flat surface. When an imaginary line passing through the outer surface of the second outer wall 12 and the end surfaces of the plurality of partition walls 21 and 22 extends, the imaginary line may form a continuous gentle curve on the outer partition wall 21, and may form a straight line on the inner partition walls 22. Therefore, it is possible to prevent the volume of the outer grill 20 from being unnecessarily increased to the rear of the circulator 100.

[Air Cleaner 1 Including Circulator 100]

Figure 9:
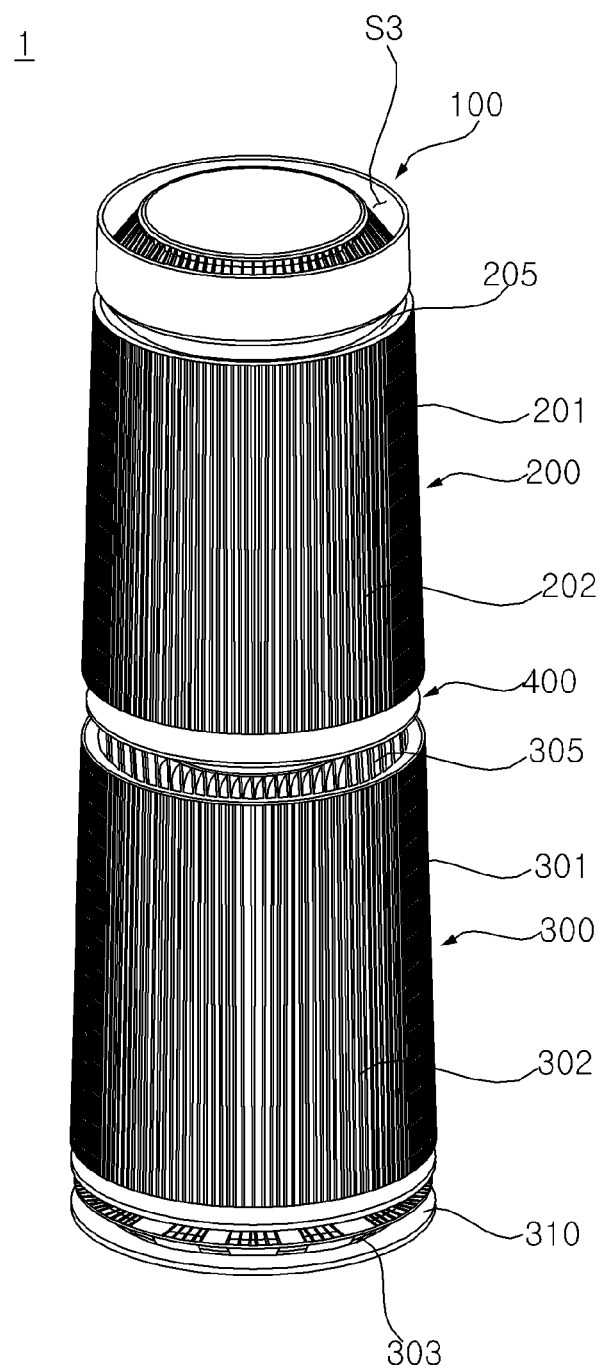
FIG. 9 is a perspective view of an air cleaner 1 including the circulator 100 of FIG. 1.

Referring to FIG. 9, the air cleaner 1 according to an embodiment of the present disclosure may include blowing devices 200 and 300, and a circulator 100 that changes the direction of air discharged from the blowing devices 200 and 300 to a direction in which airflow is directed. The blowing devices 200 and 300 may include an upper blowing device 200 that is disposed on an upper portion of the air cleaner 1 to discharge clean air, and a lower blowing device 300 that is disposed under the upper blowing device 200 to discharge clean air.

The upper blowing device 200 may include a first case 201 that defines an appearance, and the lower blowing device 300 may include a second case 301 that defines an appearance. Each of the first case 201 and the second case 301 may be formed to have a cylindrical shape. Each of the first case 201 and the second case 301 may be formed such that the diameter of an upper portion thereof is smaller than the diameter of a lower portion thereof.

Second and third inlets 202 and 302 formed of a plurality of through holes through which outside air is suctioned may be formed on outer circumferential surfaces of the first and second cases 201 and 301, so the outside air may be introduced into the blowing devices 100 and 200 in a 360-degree direction.

A base 310 may be disposed under the lower blowing device 300 to be spaced apart from the lower blowing device 300. A fourth inlet 303 may be formed in a space between the base 310 and the lower blowing device 300 to allow outside air to be introduced into the lower blowing device 300.

A second outlet 205 may be formed in the upper portion of the upper blowing device 200 to discharge filtered clean air, and a third outlet 305 may be formed in the upper portion of the lower blowing device 300 to discharge filtered clean air. The second outlet 205 may refer to a region opened to the upper portion of an upper discharge guide 280 that will be described later, and may refer to a region opened to the upper portion of an upper discharge grill 285 when the upper discharge grill 285 is disposed inside the upper discharge guide 280. The second outlet 205 may be formed between the circulator 100 disposed on the top of the upper blowing device 200 and the upper discharge grill 285.

The circulator 100 may be movably disposed on a side of the upper blowing device 200 to change the direction of air discharged through the second outlet 205 and then discharge the air to an outside. By way of example, the circulator 100 may be disposed above the second outlet 205 formed in the upper portion of the upper blowing device 200 to be spaced apart therefrom, and may change the direction of air discharged from the second outlet 205 to a direction in which airflow is directed.

Meanwhile, an air direction regulator 400 may be disposed between the upper blowing device 200 and the lower blowing device 300 to be spaced apart from the third outlet 305 of the lower blowing device 300, thus discharging the air in the radially outward direction while limiting the upward flow of the air discharged through the third outlet 305. The expression "limiting the upward flow" may mean that air discharged through the third outlet 305 of the lower blowing device 300 to the outside is prevented from being directly introduced into the upper blowing device 200 without flowing towards an external space.

The term "longitudinal section" means a section taken in a direction perpendicular to the rotating axis of the rotary guide device 290, as shown in FIGS. 10 to 13.

Figure 10:
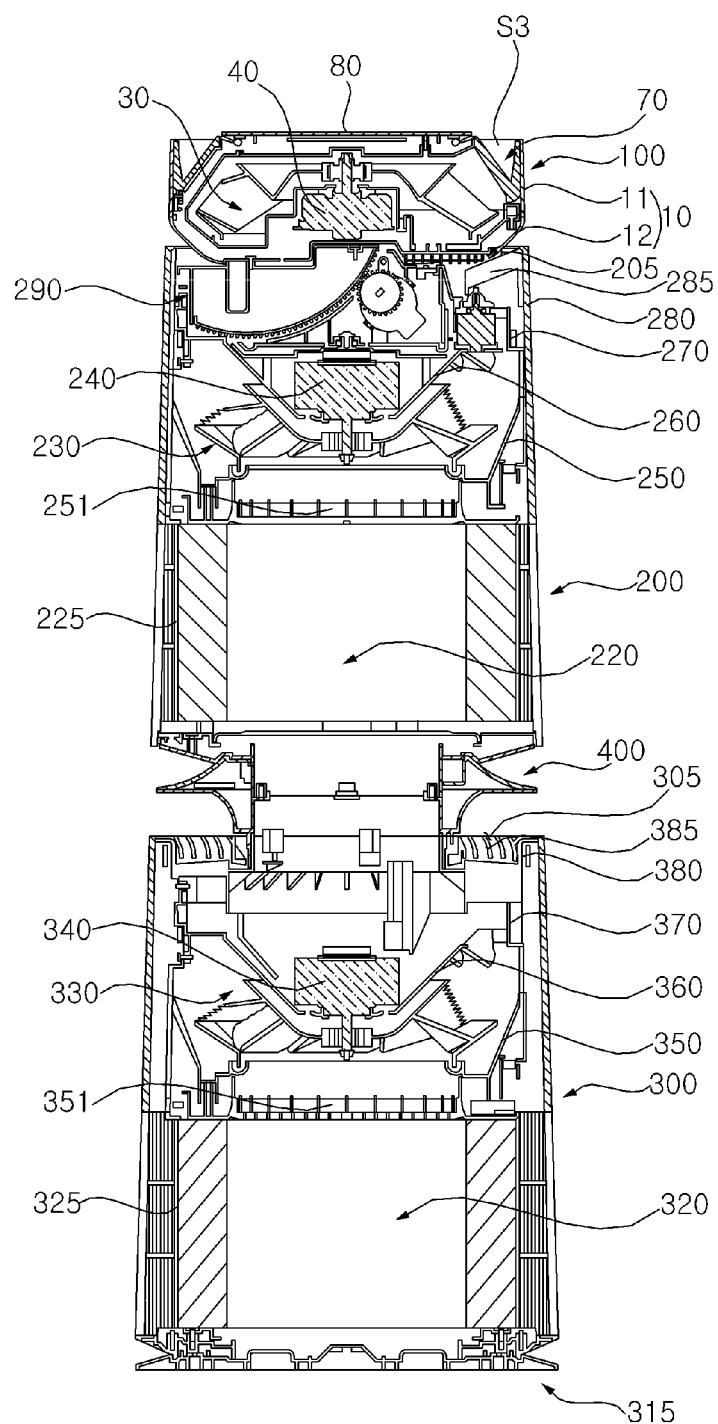
FIG. 10 is a longitudinal sectional view of the air cleaner 1 of FIG. 9.

Referring to FIG. 10, a first filter 220 may be disposed in the upper blowing device 200 to correspond to the second inlet 202 shown in FIG. 1, and the first filter 220 may be formed in a cylindrical shape.

The first filter 220 may be fixed/supported by a first filter support 225 and a first filter cover (unlabelled) coupled to the outside of the first filter support. A sensor device (unlabelled) including a dust sensor that measures the amount of dust contained in the introduced air and a gas sensor may be disposed on the upper portion of the first filter 220.

An exit may be formed in the center on the top of the first filter 220 to discharge the introduced air, and a first fan housing 250 accommodating a first blowing fan 230 may be disposed on an exit side of the first filter 220.

An upper air guide 270 may be disposed above the first fan housing 250 to guide the flow of air blown by the first blowing fan 230. Further, an upper discharge guide 280 may be disposed above the upper air guide 270 to guide the air passing through the upper air guide 270 to the upper discharge grill 285.

The second outlet 205 may be formed along the circumference of the upper discharge grill 285. As the second outlet 205 is circumferentially formed on the upper surface of the upper discharge grill 285 to be spaced apart therefrom, a plurality of second outlets 205 may be annularly disposed on the upper surface of the upper discharge grill 285.

The lower blowing device 300 may be similar in structure and function to the upper blowing device 200.

The above expression "the lower blowing device is similar in structure and function to the upper blowing device 200" may mean that components forming the lower blowing device 300 may correspond to components forming the upper blowing device 200, respectively, and these components may perform the same or similar function.

In other words, the second filter 320 of the lower blowing device 300 may correspond to the first filter 220, the second fan housing 350 may correspond to the first fan housing 250, the lower air guide 370 may correspond to the upper air guide 270, the lower discharge guide 380 may correspond to the upper discharge guide 280, and the lower discharge grill 385 may correspond to the upper discharge grill 285, respectively.

The air direction regulator 400, which is a partitioning device for separating the lower blowing device 300 from the upper blowing device 200, may be disposed above the lower discharge grill 385.

Meanwhile, air introduced through the second inlet 202 (see FIG. 9) formed in the first case 201 into the upper blowing device 200 may pass through the first filter 220, and the air passing through the first filter 220 may flow upwards to be introduced through a first fan inlet part 251 into the first blowing fan 230. The introduced air may be blown upwards by the first blowing fan 230 that is rotatably connected to the first fan motor 240, and may flow upwards by sequentially passing through the first fan housing 250, the upper air guide 270, the upper discharge guide 280, and the second outlet 205.

The circulator 100 may be installed above the second outlet 205, and air discharged from the upper discharge guide 280 may be discharged through the circulator 100 to the outside. As described above, the circulation fan 30 and the motor 40 may be provided in the circulator 100 so that air passing through the upper air guide 270 may sequentially pass through the upper discharge guide 280 and the second outlet 305 and then may be smoothly discharged to the outside.

Here, some of the air discharged from the second outlet 205 may be introduced through the first inlet S1 (see FIG. 4) into the circulator 100 to be discharged to the front of the first outlet S3.

However, some of the air discharged from the second outlet 205 may flow along the outside of the first inlet S1 without being introduced into the first inlet S1. Here, the second outer wall 12 may guide air that is discharged from the second outlet 205 and flows along the outside of the first inlet S1 so that the air flows along the outer surface of the first outer wall 11 to the front of the circulator 100 (see FIGS. 12 and 13). Therefore, the first outer wall 11 and the second outer wall 12 of the circulator 100 may prevent a problem where air discharged from the upper blowing device 200 leaks to the outside of the first inlet S1 and thus air volume is reduced, and may maximize the amount of clean air flowing in a predetermined direction.

Meanwhile, the diameter w1 of the first inlet S1 formed in the rear portion of the circulator 100 may be smaller than the diameter w4 of the second outlet 205. Here, the second outer wall 12 extending from the first inlet S1 towards the first outer wall 11 to be gradually enlarged in the radially outward direction may face at least a portion of the second outlet 205. Therefore, some of clean air discharged from the second outlet 205 may be suctioned through the first inlet S1 into the circulator to be discharged, and clean air flowing along the outside of the first inlet without being suctioned into the first inlet may be guided along the outer surface of the second outer wall 12 to the outer surface of the first outer wall 11 to be discharged in a predetermined direction.

The second outlet 205 may be circumferentially formed on the upper surface of the upper blowing device 200, and the circulator 100 may be disposed above the second outlet 205 that is circumferentially formed. Here, since the second outer wall 12 extending in the radially outward direction and the second outlet 205 may face in the circumferential direction, air discharged upwards from the second outlet 205 may be guided in a direction where airflow is directed while coming into contact with all sides of the second outer wall 12 in the circumferential direction.

Meanwhile, in order to adjust the flow direction of air discharged to the front of the circulator 100, the circulator 100 may be movably installed above the upper blowing device 200. Here, the rotary guide device 290 may be installed on the upper portion of the upper blowing device 200 to guide the motion of the circulator 100, and may be coupled to the rear portion of the circulator 100. The circulator 100 may be rotated in a certain direction by the rotary guide device 290 to change the flow direction of air discharged upwards through the second outlet 205.

Meanwhile, air introduced through the third inlet 302 formed in the second case 301 into the lower blowing device 300 may pass through the second filter 320, and air passing through the second filter 320 may flow upwards to be introduced through the second fan inlet part 351 into the second blowing fan 330. Here, the introduced air may be blown upwards by the second blowing fan 330 that is rotatably connected to the second fan motor 340, and may flow upwards by sequentially passing through the second fan housing 350, the lower air guide 370, the lower discharge guide 380, the lower discharge grill 385, and the third outlet 305.

The air blown upwards by the second blowing fan 330 may be discharged through the lower discharge grill 385 to the outside of the lower blowing device 300, and may flows in the radially outward direction of the air cleaner 1 while an upward flow being limited by the air direction regulator 400.

In the above-described embodiment, the lower blowing device 300 may be omitted. In this case, the upper blowing device 200 may be referred to as a blowing device.

Figure 11:
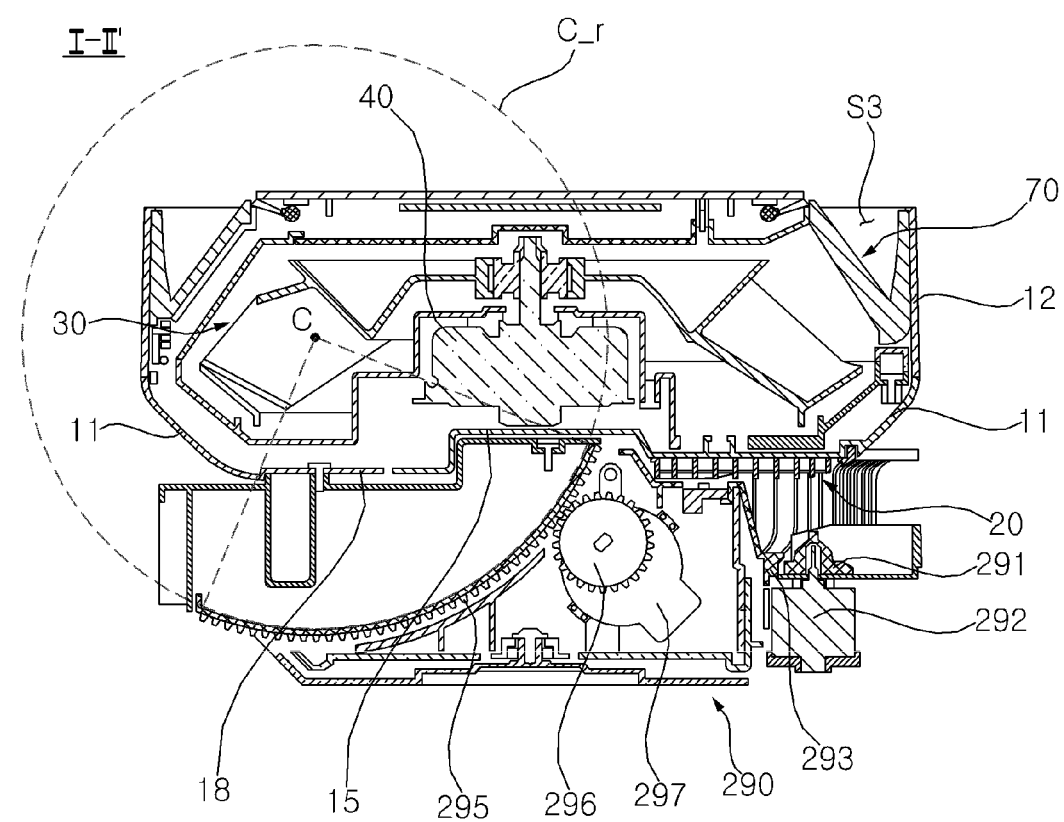
FIG. 11 is a longitudinal sectional view showing the circulator 100 and a rotary guide device 290 disposed in an upper portion of the blowing device 200 in the air cleaner 1 of FIG. 10. The longitudinal sectional view is taken along line II-IF in the circulator 100 of FIG. 3.

Referring to FIG. 11, the circulator 100 may further include the rotary guide device 290 that guides the horizontal rotation and vertical rotation of the circulator 100. The horizontal rotation may be referred to as a "first-direction rotation", and the vertical rotation may be referred to as a "second-direction rotation".

The rotary guide device 290 may include a first rotary guide mechanism to guide the first-direction rotation of the circulator 100, and a second rotary guide mechanism to guide the second-direction rotation of the circulator 100.

The first rotary guide mechanism may include a first rack 293 that guides the first-direction rotation of the circulator 100. Further, the first rotary guide mechanism may include a first gear motor 292 that generates a driving force, and a first gear 291 that is rotatably coupled to the first gear motor 292. By way of example, a step motor may be included in the first gear motor 292 to easily control a rotating angle.

If the first gear motor 292 is driven, the first gear 291 may be interlocked with the first rack 293 to cause the rotary guide device 290 to be rotated horizontally. Therefore, the circulator 100 may perform the first-direction rotation as the first rotary guide mechanism moves.

A second rack 295 may be included in the second rotary guide mechanism to guide the second-direction rotation of the circulator 100. Furthermore, a second gear motor 297 for generating the driving force and a second gear 296 coupled to the second gear motor 297 may be included in the second rotary guide mechanism. By way of example, a step motor may be included in the second gear motor 297.

If the second gear motor 297 is driven, the second gear 296 may be interlocked with the second rack 295 to cause the rotary guide device 290 to be rotated vertically. Therefore, the circulator 100 may perform the second-direction rotation as the second rotary guide mechanism moves.

If the circulator 100 rotates in the second direction, it may be at a position protruding from the upper surface of the air cleaner 1. In this case, as shown in FIG. 13, a position where the circulator 100 is obliquely erected so that the front of the circulator 100 faces a direction in which airflow is directed may be referred to as a "second position (oblique position)". On the other hand, as shown in FIG. 12, a position where the circulator 100 lies down such that the front of the circulator 100 faces upwards may be referred to as a "first position".

Figure 12:
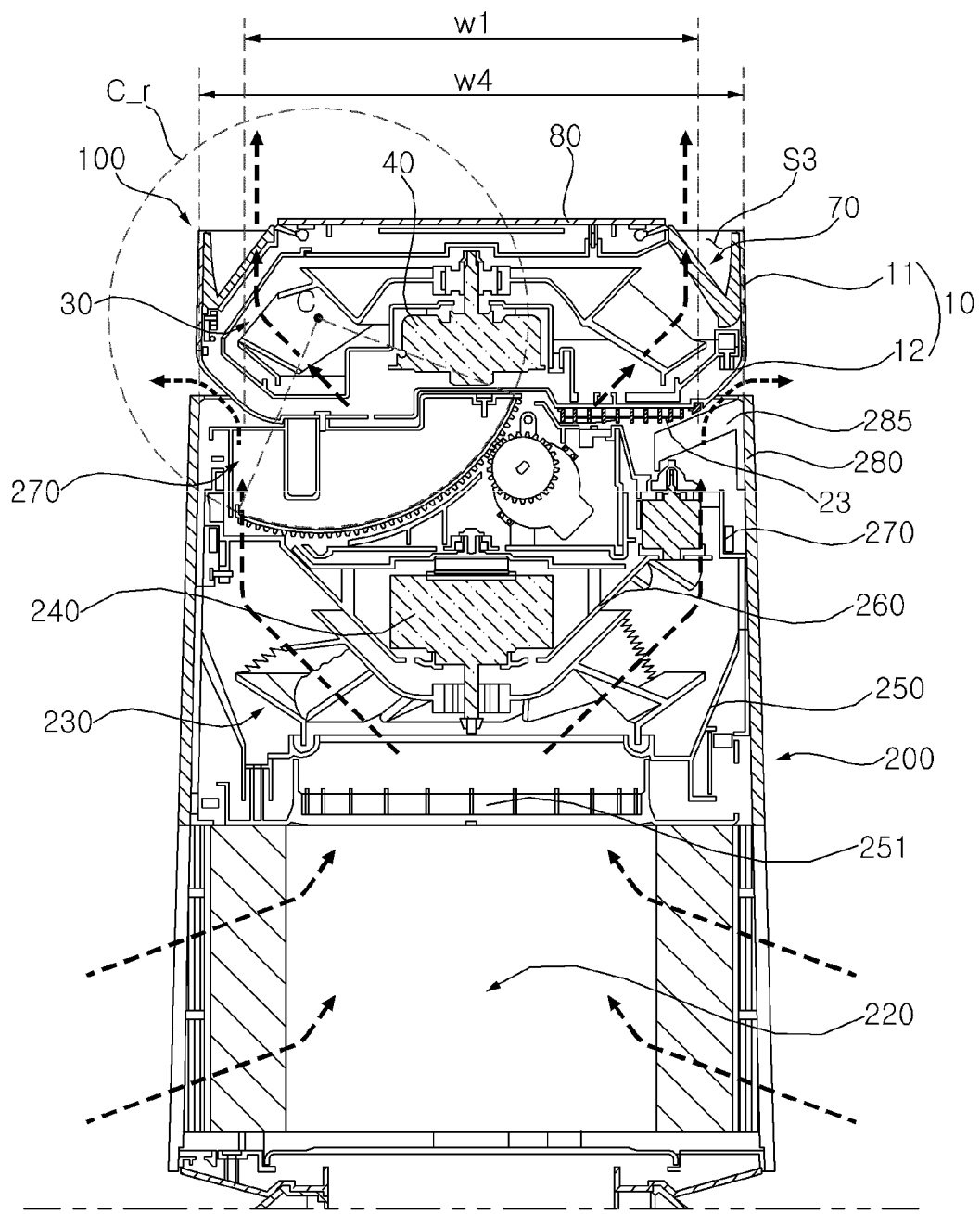
FIG. 12 is a longitudinal sectional view showing the flow of air when the circulator 100 of the air cleaner 1 of FIG. 9 is at a first position.
Figure 13:
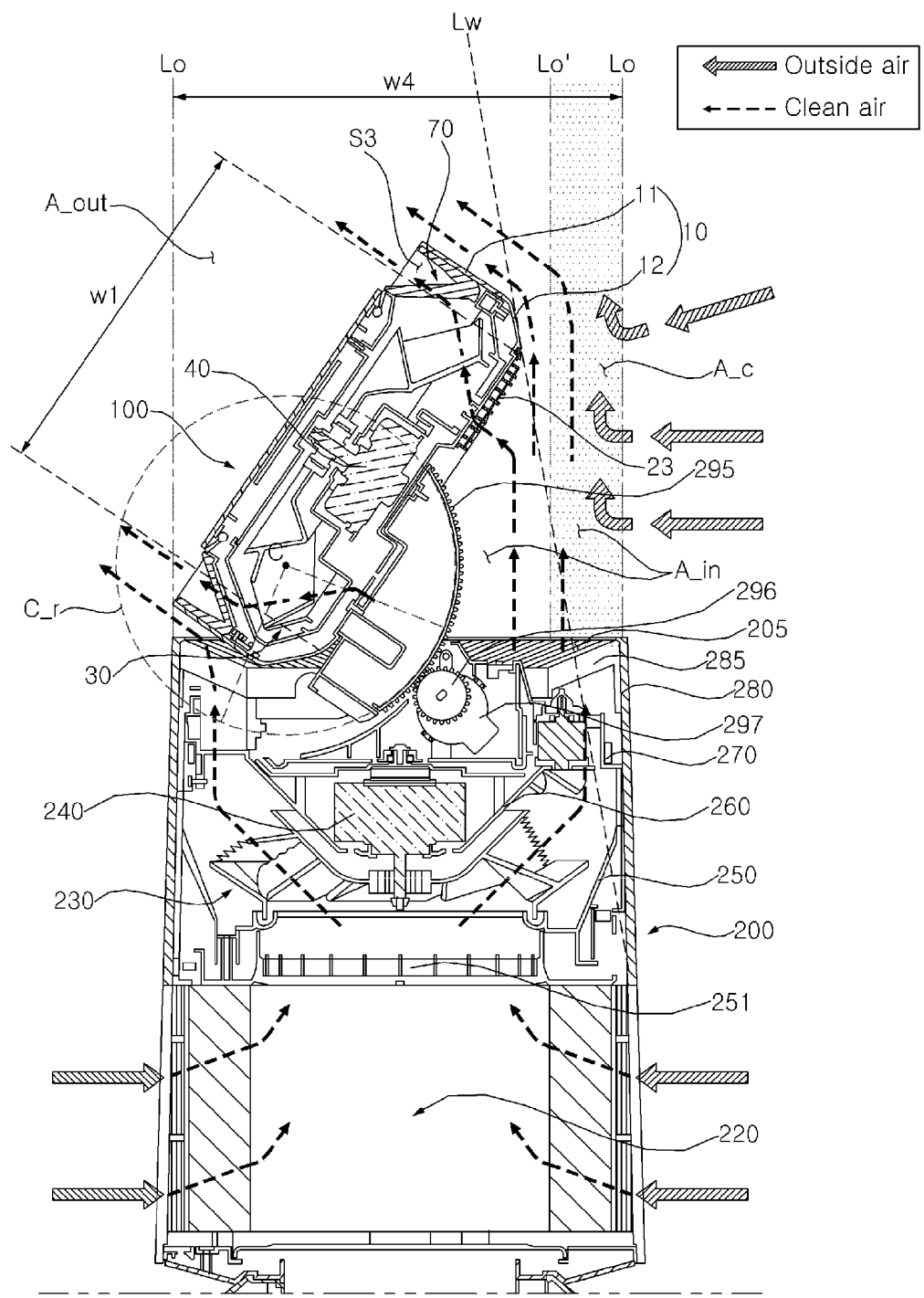
FIG. 13 is a longitudinal sectional view showing the flow of air when the circulator 100 of the air cleaner 1 of FIG. 9 is at a second position.
Figure 14:
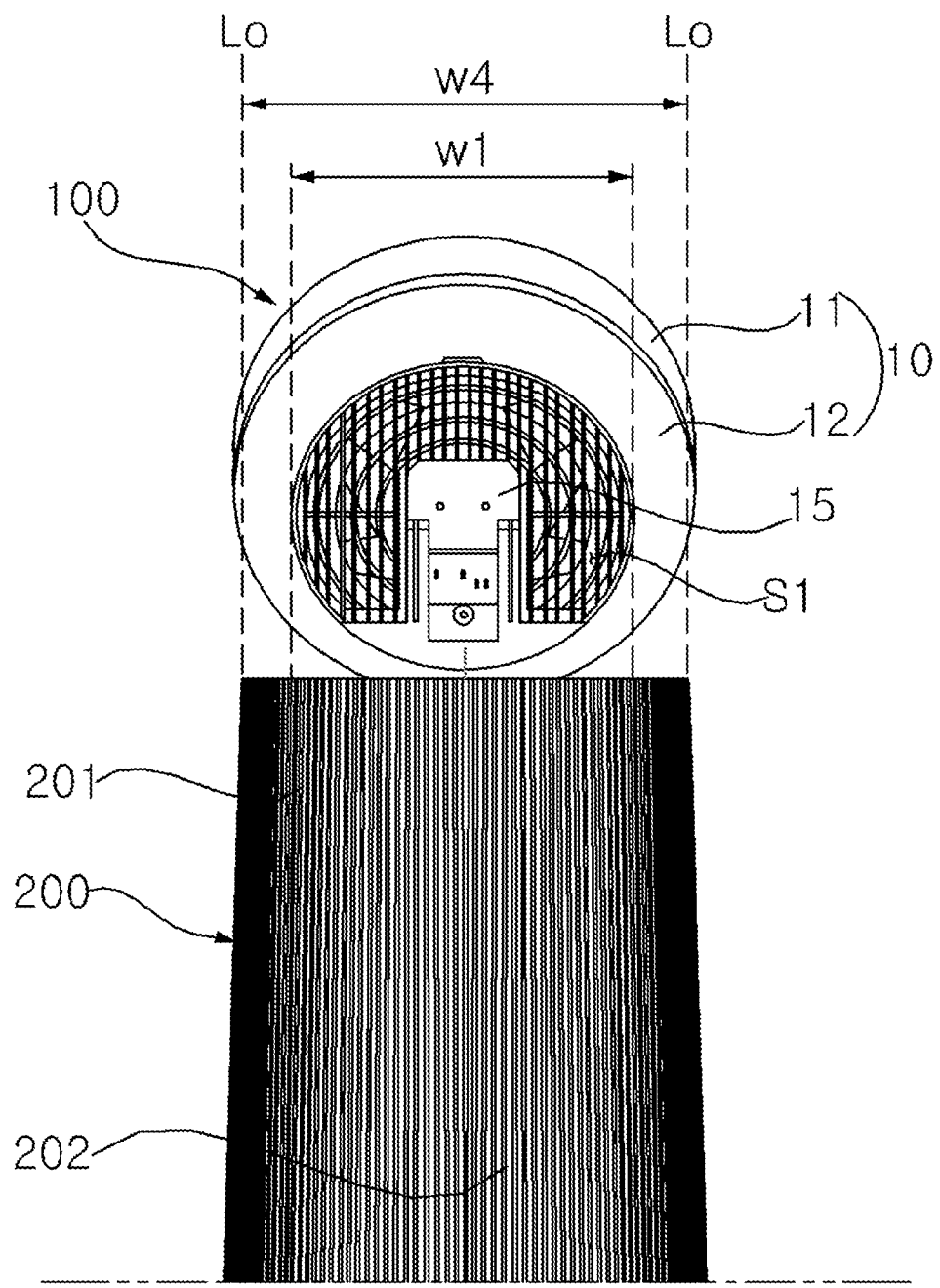
FIG. 14 is a rear side view showing the rear of the circulator 100 when the circulator 100 of the air cleaner 1 of FIG. 9 is at the second position.

Referring to FIGS. 12 to 14, as described above, air introduced through the second inlet 202 into the upper blowing device 200 may pass through the first filter 220 and flow upwards, and may be introduced through the first fan inlet part 251 into the first blowing fan 230. Here, the introduced air may be blown upwards by the first blowing fan 230, and may pass sequentially through the first fan housing 250, the upper air guide 270, and the upper discharge guide 280 to be discharged to the upper side of the second outlet 205. The first inlet 51 may be disposed above the second outlet 205. Here, when the diameter of the first inlet 51 is equal to or more than the diameter of the second outlet 205, it is more likely that outside air other than the air discharged from the second outlet 205 flows into the first inlet S1. Therefore, it is formed to have the diameter w1 smaller than the diameter w4 of the second outlet 205, thus suctioning the air discharged from the second outlet 205.

When the circulator 100 is positioned at the first or second position, the first inlet S1 may be disposed in an imaginary extension surface Lo-Lo formed by vertically extending an edge Lo of the second outlet 205. In this case, the first inlet S1 may be positioned on the region where air is discharged from the second outlet 205 to increase the intake ratio of the clean air discharged from the second outlet 205.

Meanwhile, as shown in FIG. 12, if the circulator 100 is positioned at the first position where it lies down above the upper blowing device 200, the first outer wall 11 of the circulator 100 is disposed to extend long along a direction where the air of the second outlet 205 is discharged, and the second outer wall 12 may be disposed above the second outlet 205 to be spaced apart therefrom and be disposed to obliquely face the second outlet 205. Here, the second outer wall 12 may be disposed in the air discharge direction of the second outlet 205 to be inclined in the radially outward direction.

Here, some of clean air discharged from the second outlet 205 may be introduced through the first inlet S1 (see FIG. 4) into the circulator 100 to be blown upwards by the circulation fan 30, and may pass sequentially through the motor receiving part 50 and the guide vane device 70 to be discharged upwards from the first outlet S3.

Further, some of clean air discharged from the second outlet 205 may flow towards the second outer wall 12, and may be discharged along the inclined surface formed by the second outer wall 12 in the radially outward direction of the circulator 100. Therefore, when the circulator 100 is positioned at the first position, the circulator 100 can uniformly discharge clean air discharged in one direction by the upper blowing device 200 in a 360-degree direction.

Meanwhile, as shown in FIG. 13, if the circulator 100 is obliquely erected, a region where the first inlet S2 suctions air discharged from the second outlet may be defined as an intake region A_in. Further, a region where the first outlet S3 discharges air may be defined as a discharge region A_out.

Here, the intake region A_in may be understood as a region formed above the second outlet 205 facing the first inlet s2, if the circulator 100 is obliquely erected. The intake region A_in may be formed between the rear portion of the first inlet S1 of the circulator 100 and the upper portion of the second outlet 205. Further, the discharge region A_out may be formed in front of the circulator 100.

Further, a region formed by upwardly extending the longitudinal section of the second outlet 205 positioned in the intake region A_in may be defined as an air curtain region A_c. In other words, as shown in the drawing, the air curtain region A_c may be understood as a region formed by the imaginary lines Lo and Lo' upwardly extending both ends of the second outlet 205 positioned in the intake region A_in. Here, air discharged upwards from the second outlet 205 may form airflow in the air curtain region A_c.

Meanwhile, as shown in FIG. 13, if the circulator 100 is positioned in the second position where it is erected, the first outer wall 11 may be disposed to extend long along a direction where airflow is directed, and the second outer wall 12 positioned in the intake region A_in may be disposed towards the first outer wall to be gradually enlarged along a direction where the second outlet discharges air. Preferably, the circulator 100 may be obliquely erected so that the imaginary line Lw extending the longitudinal section of the second outer wall 12 passes through the upper surface of the blowing device in which the second outlet 205 is formed.

Some of clean air discharged from the second outlet 205 may be introduced through the first inlet 51 (see FIG. 4) into the circulator 100 to be blown by the circulation fan 30 in a direction where airflow is directed, and may pass sequentially through the motor receiving part 50 and the guide vane device 70 to be discharged to the front of the first outlet S3.

Furthermore, some of clean air discharged from the second outlet 205 may flow towards the second outer wall 12, and may be guided along the inclined surface formed by the second outer wall 12 to the outer surface of the first outer wall 11 and then be discharged towards the front of the circulator 100. Therefore, when the circulator 100 is positioned at the second position, the circulator 100 can minimize a loss of flow energy due to the leakage of the clean air, discharged from the upper blowing device 200, to the outside of the circulator 100 and a reduction in air volume discharged in a direction where the airflow is directed.

Here, the flow of clean air guided to the first outer wall 11 while flowing along the outer surface of the second outer wall 12 and the formation of the inclined surface of the second outer wall 12 with respect to the inflow direction of the outside air serve as a resistance element to the inflow of the outside air into the first inlet 51. Therefore, the inflow of the outside air into the circulator 100 can be reduced, and the intake ratio of the clean air to the outside air can be increased.

Meanwhile, the circulator 100 may be obliquely erected such that the first inlet 51 is spaced apart from the air curtain region A_c. Here, the first inlet 51 suctions clean air discharged from the second outlet 205 in the intake region A_in, and upward airflow formed in the air curtain region A_c is suctioned to the first inlet 51 while serving as a resistance element to the flow of the outside air to the first inlet 51, so it is possible to reduce the ratio of the outside air suctioned by the first inlet 51.

Figure 15A:
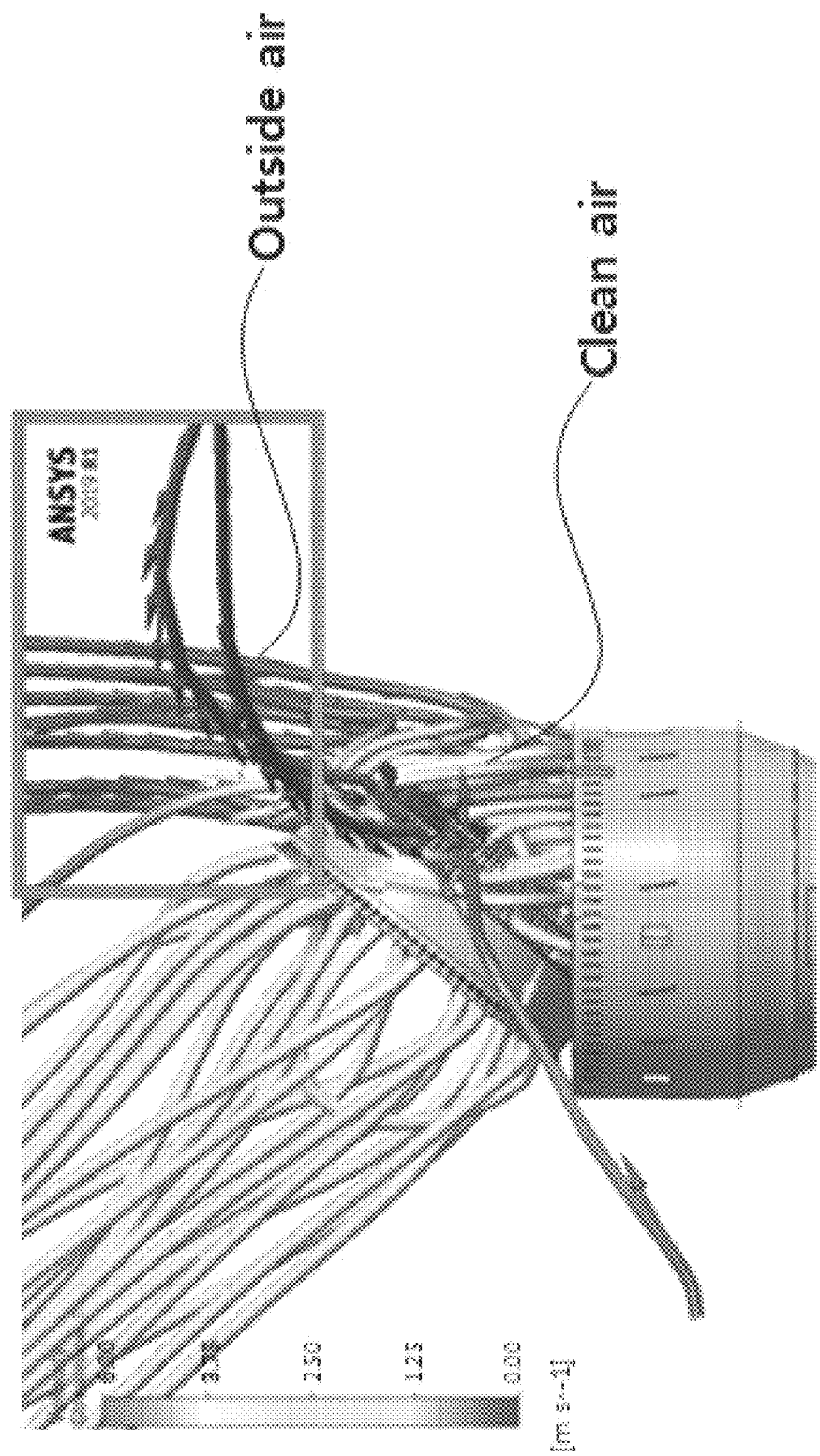
FIGS. 15A and 15B are diagrams showing the results of simulating the air flow of the air cleaner 1 according to an embodiment of the present disclosure and an air cleaner according to another embodiment.
Figure 15B:
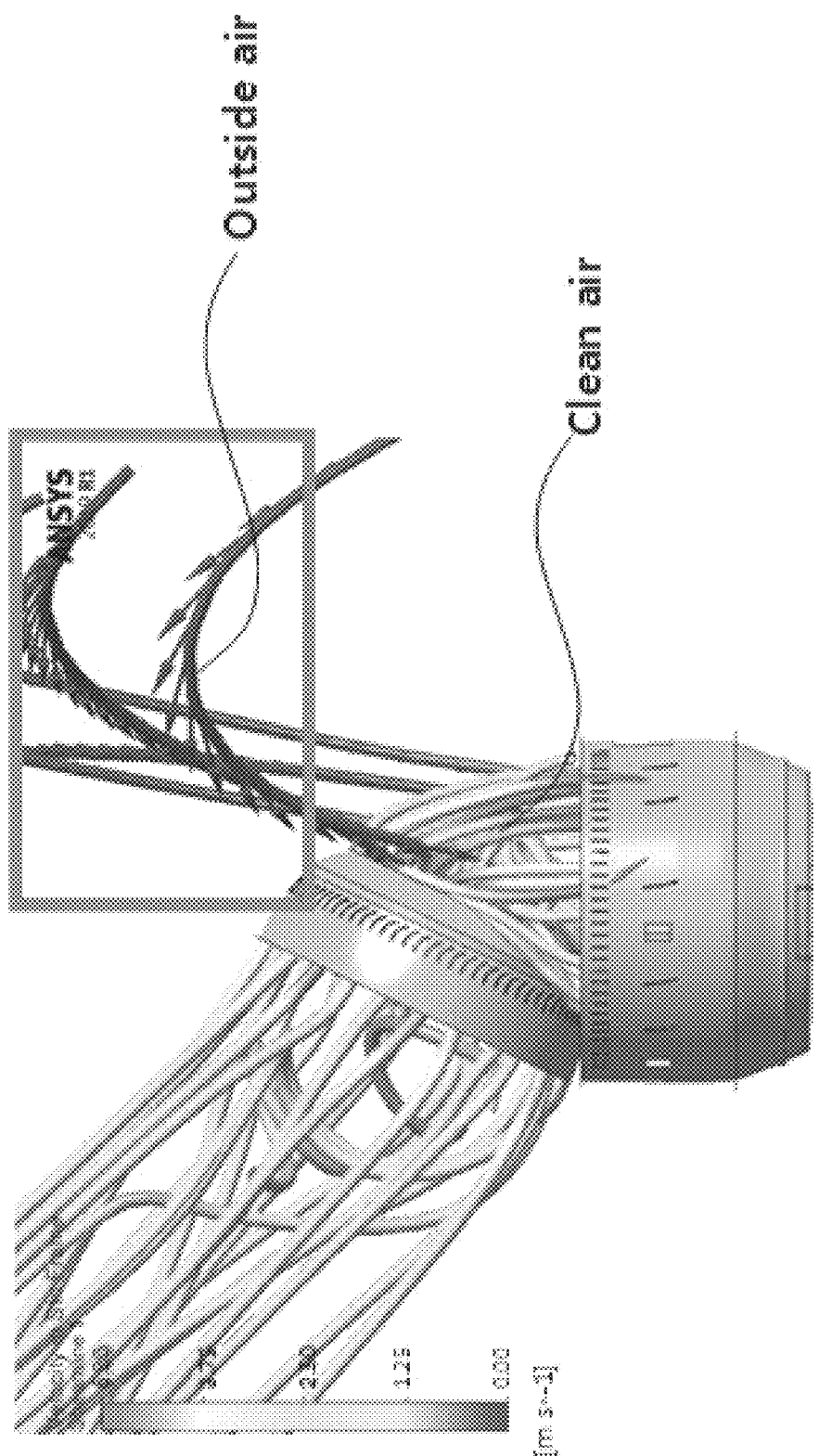
Figure 16:
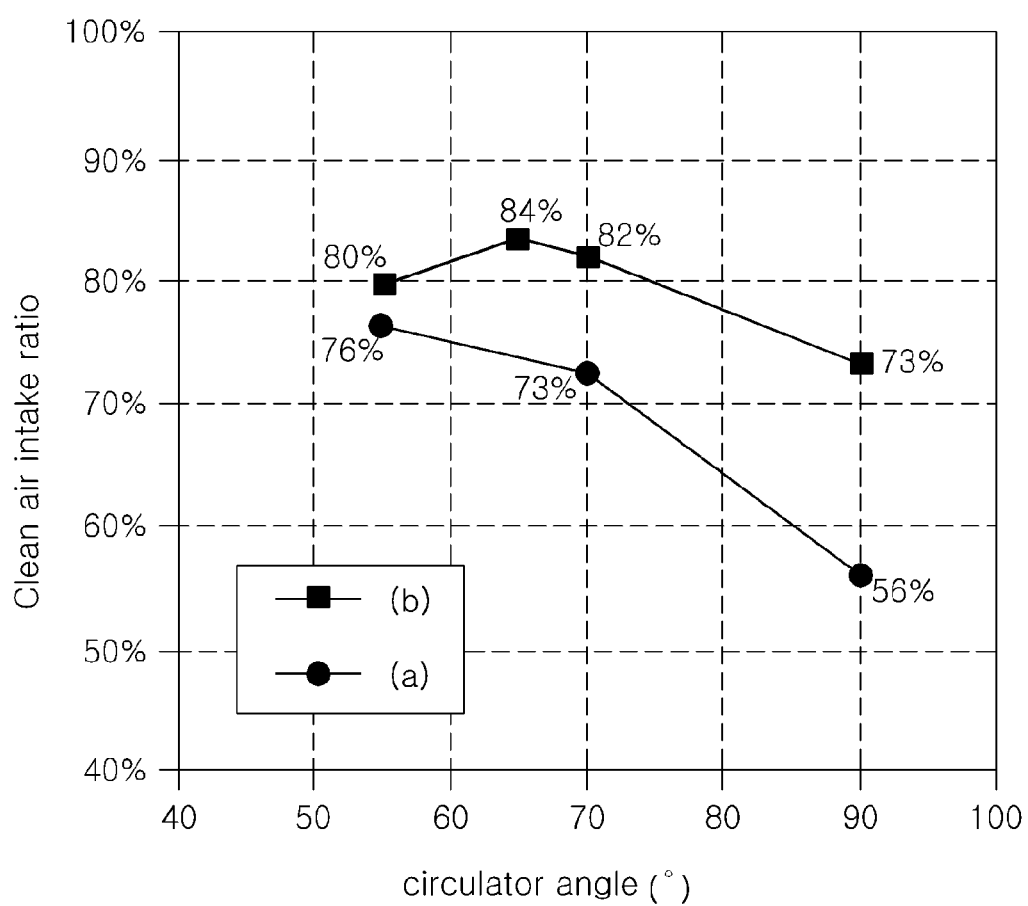
FIG. 16 is a diagram showing the comparison of a suction ratio of clean air for each angle of the circulator according to the flow analysis result of FIGS. 15A and 15B.

When the circulator is obliquely erected such that the plane formed by the first inlet S1 and the upper surface of the blowing device formed by the second outlet 205 form an angle of 60° to 70°, it can be seen that the first inlet S1 is spaced apart from the air curtain region A_c, and the clean-air intake ratio becomes a maximum (see FIGS. 15A and 15B and 16).

Meanwhile, the second rack 925 may rotate vertically about a curvature center C formed by the rack to adjust the second-direction rotation of the circulator 100.

Here, if the curvature radius formed by the second rack 295 is too large, the rack 295 may be rotated so that the air curtain region A_c may be formed narrow or be omitted when the circulator 100 is obliquely erected.

Therefore, when the circulator 100 is at the second position, the second rack 295 may be spaced apart from the air curtain region A_c. In other words, an imaginary circle C_r extending the second rack along the curvature of the second rack 295 may be spaced apart from the air curtain region A_c. Here, the second rack 295 may rotate along the imaginary circle C_r to vertically rotate the circulator 100. Therefore, the circulator 100 has a motion in an inner region of the air curtain region A_c, so it is possible to reduce the ratio of the outside air suctioned into the circulator when the circulator 100 is at an oblique position. In this case, the second rack 295 may form the curvature radius such that the curvature center C is formed inside the circulator 100.

Meanwhile, the filter member 23 may be disposed in the first inlet S1 to remove dust from the air suctioned through the first inlet S1. In this case, it is advantageous in that clean air suctioned from the second outlet 205 can be filtered once again, and outside air which does not undergo the cleaning operation can be filtered.

Here, if the filter member 23 continuously filters the outside air, the dust collection efficiency of the filter member 23 may be rapidly reduced and a replacement cycle may be shortened. Thus, it is preferable to reduce the intake ratio of the outside air as much as possible through the above-described embodiments.

Referring to FIGS. 15A and 15B and 16, FIG. 15B shows the air cleaner 1 according to an embodiment of the present disclosure, and FIG. 15A shows an air cleaner according to another embodiment. In FIG. 15A, the circulator is inclined relative to the blowing device at about 55°, the second outer wall 12 is not included, an intake grill (unlabelled) in which a plurality of vent holes is formed is located at a position of the second outer wall 12, and the air curtain region A_c is rarely formed in the intake region A_in. According to the flow analysis result, in the case of FIG. 15A, a large amount of outside air is suctioned into the circulator along the circumference of the intake grill. On the other hand, in the case of FIG. 15B, such a problem is solved, so the ratio of the outside air suctioned into the circulator 100 is reduced and the intake ratio of the clean air is increased.

In the case of FIG. 15A, when the circulator is inclined at about 55°, the maximum value (76%) of the clean-air intake ratio is observed. In the case of FIG. 15B, the clean-air intake ratio is higher than that of FIG. 15A at all observed angles. In particular, when the circulator 100 of FIG. 15B is inclined at about 65°, the maximum value (84%) of the clean-air intake ratio is observed. This shows that the maximum value of the clean-air intake ratio increases by about 8% as compared to the maximum value of FIG. 15A.

Although the present invention was described with reference to specific embodiments shown in the drawings, it is apparent to those skilled in the art that the present invention may be changed and modified in various ways without departing from the scope of the present invention, which is described in the following claims.

DETAILED DESCRIPTION OF MAIN ELEMENTS

| | |
|---|---|
| 1: air cleaner | 100: circulator |
| 10: housing | 11: first outer wall |
| 12: second outer wall | 12a: first surface |
| 12b: second surface | 20: outer grill |
| 21: outer partition wall | 22: inner partition wall |
| 30: circulation fan | 40: motor |
| 50: motor receiving part | 60: fan cover part |
| 70: guide vane device | 80: front panel |
| S1: first inlet | S3: first outlet |

-continued

| | |
|---|---|
| 200: upper blowing device, blowing device | 205: second outlet |
| A_in: intake region | A_c: air curtain region |
| A_out: discharge region | |

What is claimed is:

1. An air cleaner comprising:
a blowing device comprising a blowing fan configured to discharge air upward; and
a circulator movably disposed above the blowing device and configured to change a flow direction of the air discharged from the blowing fan,
wherein the circulator comprises:
a housing,
a circulation fan disposed in the housing,
a motor configured to rotate the circulation fan,
a first inlet defined at a rear portion of the housing in a longitudinal direction of a rotational axis of the circulation fan, and
a first outlet defined at a front portion of the housing in the longitudinal direction,
wherein the circulation fan is configured to suction air through the first inlet and to discharge the suctioned air forward through the first outlet,
wherein the blowing device defines a second outlet at an upper surface thereof, the second outlet being configured to discharge air upward from the blowing fan, and
wherein the housing comprises:
a first outer wall that extends in the longitudinal direction and about the rotational axis of the circulation fan, the first outer wall comprising the front portion that defines the first outlet, and
a second outer wall that extends from an edge of the first inlet in a radially outward direction toward the first outer wall, and
wherein the first outer wall and the second outer wall define an entirety of an outer circumferential surface of the circulator in a circumferential direction of the circulator.

2. The air cleaner of claim 1, wherein the circulator is configured to move to an obliquely erected position with respect to the blowing device, and
wherein an upper end of the first inlet is configured to, based on the circulator being disposed at the obliquely erected position, be located radially inward of a virtual space extending vertically upward from the second outlet.

3. The air cleaner of claim 2, wherein a plane of the first inlet is configured to, based on the circulator being disposed at the obliquely erected position, define an angle of 60° to 70° with respect to the upper surface of the blowing device.

4. The air cleaner of claim 1, further comprising:
a gear disposed at an upper portion of the blowing device;
a gear motor configured to rotate the gear; and
a rack disposed at a rear portion of the circulator and interlocked with the gear,
wherein the gear motor is configured to rotate the gear to move the circulator to an obliquely erected position with respect to the blowing device.

5. The air cleaner of claim 4, wherein, when the circulator is obliquely erected, a region where the first inlet suctions the air discharged from the second outlet is defined as an intake region, a region upwardly extending a longitudinal section of the second outlet positioned in the intake region is defined as an air curtain region, and an imaginary circle ($C\_r$) extending the rack along a curvature of the rack is spaced apart from the air curtain region.

6. The air cleaner of claim 1, further comprising a filter member disposed in the first inlet.

7. The air cleaner of claim 1, wherein the second outer wall extends from the edge of the first inlet and is inclined toward the first outer wall, the second outer wall being configured to guide the air discharged from the second outlet to flow along an outside of the first inlet such that the air flows to a front of the circulator along an outer surface of the first outer wall.

8. The air cleaner of claim 7, wherein the outer surface of the first outer wall and an outer surface of the second outer wall define a continuous surface.

9. The air cleaner of claim 8, wherein the outer surface of the first outer wall has a cylindrical shape.

10. The air cleaner of claim 7, wherein an outer surface of the second outer wall comprises a first surface extending towards the first outer wall to be rounded outwards.

11. The air cleaner of claim 10, wherein the outer surface of the second outer wall comprises a second surface that extends from the edge of the first inlet towards the first surface so that a slope of a longitudinal section is constant.

12. The air cleaner of claim 7, wherein, when the circulator is obliquely erected, a region where the first inlet suctions the air discharged from the second outlet is defined as an intake region, and, if the circulator is obliquely erected, the first outer wall is disposed to extend long along a direction where airflow is directed, and the second outer wall positioned in the intake region is disposed towards the first outer wall to be gradually enlarged along a direction where the second outlet discharges the air.

13. The air cleaner of claim 1, wherein the circulation fan is an oblique-flow fan that suctions the air through the first inlet and then discharges the air through the first outlet in a forwardly inclined direction of the housing.

14. The air cleaner of claim 13, wherein the oblique-flow fan comprises:
a hub disposed at a front of the motor and connected to an output shaft of the motor;
a shroud disposed at a back of the hub and spaced apart from the hub, the shroud having an inlet at a central portion thereof to suction air; and
a plurality of blades disposed between the hub and the shroud.

15. The air cleaner of claim 14, wherein the hub and the shroud extend forward, are enlarged in the radially outward direction, and face the second outer wall.

16. The air cleaner of claim 14, wherein each of the blades extends from the shroud to the hub to be inclined forwards.

17. The air cleaner of claim 13, wherein the circulator comprises a guide vane device that is disposed in the housing to guide the air discharged by the oblique-flow fan to the front portion of the housing.

18. The air cleaner of claim 1, wherein an outer surface of the first outer wall and an outer surface of the second outer wall define a continuous surface.

* * * * *